United States Patent
Christensen

(10) Patent No.: US 12,260,756 B2
(45) Date of Patent: *Mar. 25, 2025

(54) EMERGENCY VEHICLE DETECTION AND AVOIDANCE SYSTEMS FOR AUTONOMOUS VEHICLES

(71) Applicant: STATE FARM MUTUAL AUTOMOBILE INSURANCE COMPANY, Bloomington, IL (US)

(72) Inventor: Scott T. Christensen, Salem, OR (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 248 days.

This patent is subject to a terminal disclaimer.

(21) Appl. No.: 17/974,311

(22) Filed: Oct. 26, 2022

(65) Prior Publication Data
US 2023/0056551 A1    Feb. 23, 2023

Related U.S. Application Data

(63) Continuation of application No. 16/739,741, filed on Jan. 10, 2020, now Pat. No. 11,501,639, which is a
(Continued)

(51) Int. Cl.
*G08G 1/09* (2006.01)
*G05D 1/00* (2006.01)
(Continued)

(52) U.S. Cl.
CPC ..... *G08G 1/096791* (2013.01); *G05D 1/0055* (2013.01); *G08G 1/096811* (2013.01); *G08G 1/205* (2013.01); *H04W 4/40* (2018.02)

(58) Field of Classification Search
CPC ....... G08G 1/096791; G08G 1/096811; G08G 1/205; G08G 1/0965; G08G 1/096805; H04W 4/40; H04W 4/029; H04W 4/90
See application file for complete search history.

(56) References Cited

U.S. PATENT DOCUMENTS 9,278,689 B1 * 3/2016 Delp ................. G08G 1/0965
9,505,494 B1 * 11/2016 Marlow .............. G05D 1/0011
(Continued)

FOREIGN PATENT DOCUMENTS

EP    3239686 A1    11/2017
EP    3578433 B1    8/2020
(Continued)

*Primary Examiner* — Mary Cheung
(74) *Attorney, Agent, or Firm* — MARSHALL, GERSTEIN & BORUN LLP

(57) ABSTRACT

The present disclosure generally relates to generating emergency vehicle warnings, automatic control of autonomous vehicles based upon the emergency vehicle warnings. More particularly, the present disclosure relates to generating data representative of emergency vehicle warnings and alternate autonomous vehicle routing based upon real-time information related to an emergency vehicle. The information related to the emergency vehicle may include emergency vehicle origination location data, emergency vehicle current location data, emergency vehicle route data, and/or emergency vehicle destination location data. An emergency vehicle warning and/or alternate vehicle routing for autonomous vehicles may be generated based further on information related to an autonomous vehicle. In one aspect, an emergency vehicle may wirelessly communicate with the autonomous vehicle and/or an insurance provider remote server. The insurance provider may adjust auto insurance for insured individuals, having vehicles with the vehicle safety functionality discussed herein, to reflect lower risk and provide insurance savings to customers.

20 Claims, 8 Drawing Sheets

Related U.S. Application Data continuation of application No. 15/680,945, filed on Aug. 18, 2017, now Pat. No. 10,565,873.

(51) Int. Cl.
*G08G 1/00* (2006.01)
*G08G 1/0967* (2006.01)
*G08G 1/0968* (2006.01)
*H04W 4/40* (2018.01)

(56) References Cited

U.S. PATENT DOCUMENTS

| | | |
|---|---|---|
| 9,830,748 B2 | 11/2017 | Rosenbaum |
| 9,905,133 B1 * | 2/2018 | Kumar ............... G07C 5/0808 |
| 9,990,782 B2 | 6/2018 | Rosenbaum |
| 10,102,586 B1 * | 10/2018 | Marlow ............... G06Q 40/08 |
| 10,269,190 B2 | 4/2019 | Rosenbaum |
| 10,467,824 B2 | 11/2019 | Rosenbaum |
| 11,227,452 B2 | 1/2022 | Rosenbaum |
| 11,407,410 B2 | 8/2022 | Rosenbaum |
| 11,524,707 B2 | 12/2022 | Rosenbaum |
| 11,594,083 B1 | 2/2023 | Rosenbaum |
| 2001/0044697 A1 | 11/2001 | Kageyama |
| 2014/0129137 A1 * | 5/2014 | Yamashiro ......... G01C 21/3407 701/515 |
| 2015/0321641 A1 | 11/2015 | Abou Mahmoud |
| 2018/0012492 A1 | 1/2018 | Baldwin |
| 2018/0075759 A1 | 3/2018 | Kim |
| 2018/0364732 A1 | 12/2018 | Yaldo |
| 2018/0374347 A1 | 12/2018 | Silver |
| 2019/0027032 A1 | 1/2019 | Arunachalam |
| 2022/0092893 A1 | 3/2022 | Rosenbaum |
| 2022/0340148 A1 | 10/2022 | Rosenbaum |
| 2023/0060300 A1 | 3/2023 | Rosenbaum |

FOREIGN PATENT DOCUMENTS

| | | |
|---|---|---|
| EP | 3730375 B1 | 10/2021 |
| EP | 3960576 A1 | 3/2022 |
| EP | 4190659 A1 | 6/2023 |
| EP | 4190660 A1 | 6/2023 |
| WO | WO-2017151937 A1 | 9/2017 |
| WO | WO-2018022021 A1 | 2/2018 |

* cited by examiner

EMERGENCY VEHICLE DETECTION AND AVOIDANCE SYSTEMS FOR AUTONOMOUS VEHICLES

CROSS REFERENCE TO RELATED APPLICATION

This application is a continuation of U.S. patent application Ser. No. 16/739,741, filed Jan. 10, 2020, which is a continuation of U.S. patent application Ser. No. 15/680,945, filed Aug. 18, 2017, the entire disclosures of which are hereby expressly incorporated herein by reference.

TECHNICAL FIELD

The present disclosure generally relates to methods and systems for automatic operation of autonomous vehicles. More particularly, the present disclosure relates to methods and systems for automatic operation of autonomous vehicles based on emergency vehicle warnings.

BACKGROUND

Emergency response vehicles are often slowed down on their way to a scene of a fire, an accident, etc. by other vehicles that do not move out of the way. This condition (blocked roads) often slows first responders when time is of the essence. These circumstances may lead to accidents and collisions between emergency responders and other vehicles.

Autonomous vehicles are becoming more prevalent in many parts of the world. Operation of Autonomous vehicles on roadways along with operation of emergency vehicles presents a unique challenge.

Methods and systems are needed for automatic operation of autonomous vehicles based on emergency vehicle warnings.

SUMMARY

Systems and methods are provided for automatic operation of autonomous vehicles based on emergency vehicle warnings. The systems and methods of the present disclosure may reduce emergency vehicle/autonomous vehicle collision accidents, speed response time of emergency vehicles (e.g., fire trucks, ambulances, police, etc.), which may reduce fire losses, and/or faster response to auto accidents may reduce injuries and/or save lives.

A computer implemented method for automatically operating an autonomous vehicle based upon data representative of an emergency vehicle warning may include receiving, at a processor of a computing device, emergency vehicle data. The emergency vehicle data may be representative of at least one of: emergency vehicle origination position data, emergency vehicle existing position data, emergency vehicle course data, and emergency vehicle end position data. The method may also include receiving, at a processor of a computing device, autonomous vehicle data. The autonomous vehicle data may be representative of at least one of: autonomous vehicle origination position data, autonomous vehicle existing position data, autonomous vehicle course data, and autonomous vehicle end position data. The method may further include generating, using a processor of a computing device, autonomous vehicle route data based upon the emergency vehicle data and the autonomous vehicle data, and automatically controlling operation of the autonomous vehicle based upon the autonomous vehicle route data.

In another embodiment, a system for automatically controlling operation of an autonomous vehicle including a transceiver configured to communicate via at least one communication network, a memory storing a set of computer-executable instructions, and a processor interfacing with the transceiver and the memory, and configured to execute the set of computer-executable instructions to cause the processor to receive, via the transceiver, emergency vehicle data. The emergency vehicle data may be representative of at least one of: emergency vehicle origination location data, emergency vehicle current location data, emergency vehicle route data, and emergency vehicle destination location data. Execution of the instructions by the processor may also cause the processor to receive, via the transceiver, autonomous vehicle data. The autonomous vehicle data may be representative of at least one of: autonomous vehicle origination location data, autonomous vehicle current location data, autonomous vehicle route data, and autonomous vehicle destination location data. Execution of the instructions by the processor may further cause the processor to generate autonomous vehicle route data based upon the emergency vehicle data and the autonomous vehicle data, generate a set of autonomous vehicle operation commands based upon the autonomous vehicle route data, and transmit, via the transceiver, the set of autonomous vehicle operation commands to the autonomous vehicle. Operation of the autonomous vehicle may be automatically controlled according to the set of autonomous vehicle operation commands.

In a further embodiment, a non-transitory computer-readable medium storing instructions that, when executed by a processor of a computing device, may cause the processor to automatically control operation of an autonomous vehicle based upon emergency vehicle warning data. The non-transitory computer-readable medium may include an emergency vehicle data receiving module that, when executed by a processor of a computing device, causes the processor to receive emergency vehicle data. The emergency vehicle data may be representative of at least one of: emergency vehicle origination location data, emergency vehicle current location data, emergency vehicle route data, and emergency vehicle destination location data. The non-transitory computer-readable medium may also include an autonomous vehicle data receiving module that, when executed by a processor of a computing device, causes the processor to receive autonomous vehicle data. The autonomous vehicle data may be representative of at least one of: autonomous vehicle origination location data, autonomous vehicle current location data, autonomous vehicle route data, and autonomous vehicle destination location data. The non-transitory computer-readable medium may further include an emergency vehicle warning data generation module that, when executed by a processor of a computing device, may cause the processor to generate autonomous vehicle route data, based upon the emergency vehicle data and the autonomous vehicle data. The non-transitory computer-readable medium may yet further include an alternate driving route module that, when executed by a processor of a computing device, may cause the processor to automatically control operation of the autonomous vehicle based upon the autonomous vehicle route data.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed herein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein.

Figure 1A:
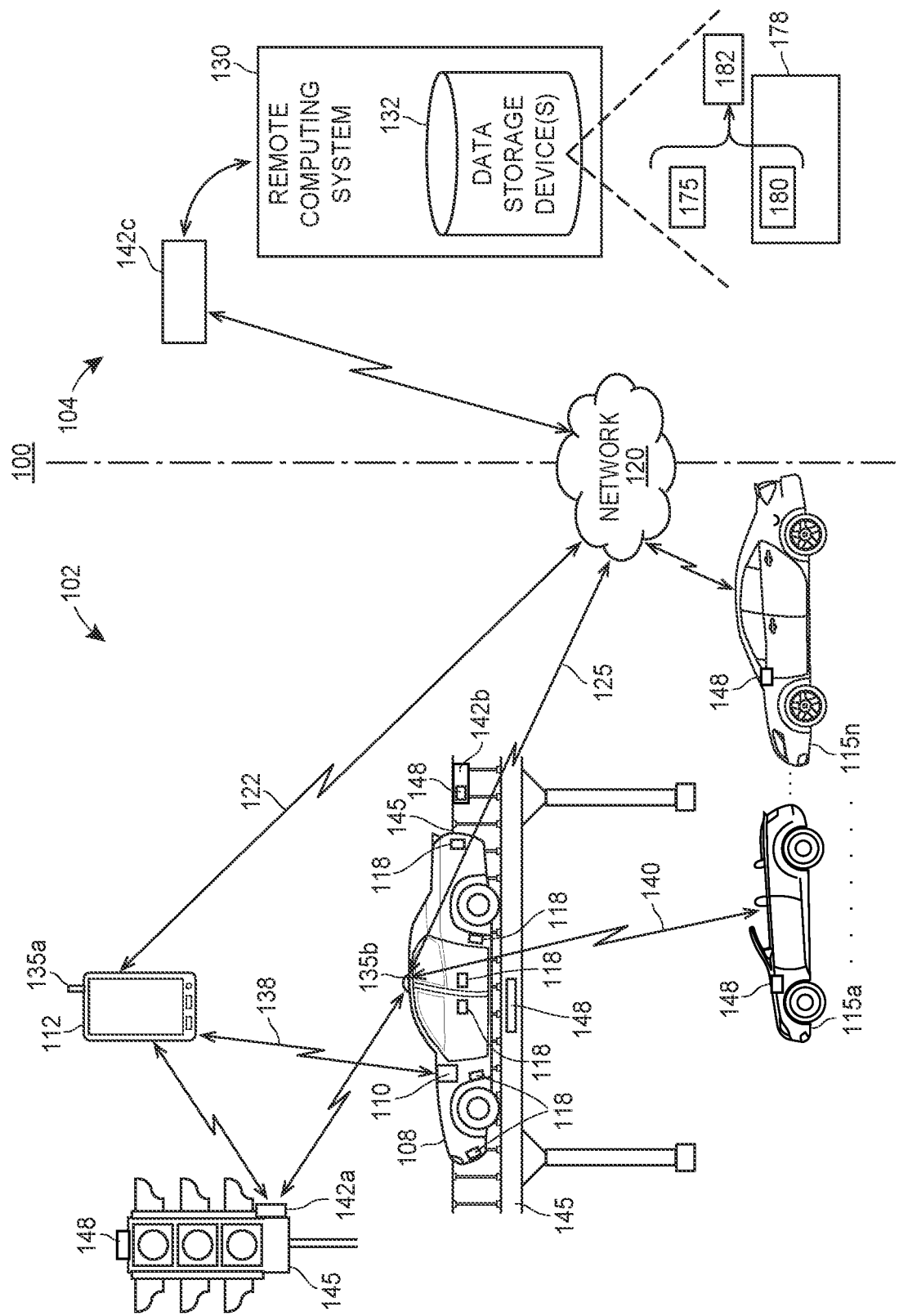
FIG. 1A depicts an exemplary system for automatically operating an autonomous vehicle based upon emergency vehicle warning data.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Systems and methods are provided for automatic operation of autonomous vehicles based upon emergency vehicle warnings (e.g., emergency vehicle information, emergency vehicle warning data, etc.). An emergency vehicle location alert may be provided to vehicle operators to provide emergency alerts to, for example, cellular telephones. In one exemplary embodiment, the system may be similar to a nationwide text emergency alert system, called Wireless Emergency Alerts (WEA), as implemented by the National Weather Service. Vehicles in a path of police, fire trucks, and ambulances, etc. may, thereby, be warned of impending emergencies. WEA-capable telephones may be provided to deliver just-in-time driver alerts that warn of approaching EMS vehicles. The alerts may be tailored with messages, such as "stop," "move right," "move left," "move onto the shoulder," "merge to right lane," and/or the like, or just duplicate a siren tone, to clear the road ahead. Additionally or alternatively, autonomous vehicles may be automatically re-routed, based upon emergency vehicle warning data to, for example, clear a path for emergency response vehicles. Algorithms may be provided to determine a relative position of emergency management services (EMS) vehicles and local traffic so as to not unduly warn and/or re-direct vehicles that are not in a path of travel of the EMS vehicles.

Accordingly, the systems and methods of the present disclosure generally relate to generating emergency vehicle warning data and automatic control of autonomous vehicle routing based upon the emergency vehicle warning data. More particularly, the methods and systems relate to generating data representative of emergency vehicle warnings and alternate autonomous vehicle routing based upon real-time information related to an emergency vehicle. The information related to the emergency vehicle may include, for example, emergency vehicle origination location data, emergency vehicle current location data, emergency vehicle route data, and/or emergency vehicle destination location data. Emergency vehicle warning data may be generated based further upon information related to an autonomous vehicle. The information related to the autonomous vehicle may include, for example, autonomous vehicle origination location data, autonomous vehicle current location data, autonomous vehicle route data, and/or autonomous vehicle destination location data.

The systems and methods may further generate insurance-related data based upon, for example, emergency vehicle warning data, alternate autonomous vehicle routing data, and/or telematics data. The insurance-related data may be representative of, for example, a lower insurance risk for an emergency vehicle that includes an emergency vehicle device (e.g., emergency vehicle device 205*b* of FIG. 2B) compared to an emergency vehicle that does not include an emergency vehicle device 205*b*. Furthermore, the insurance-related data may be representative of a lower insurance risk for an autonomous vehicle that includes an autonomous vehicle device (e.g., autonomous vehicle device 265*b* of FIG. 2B) compared to an autonomous vehicle that does not include an autonomous vehicle device 205*b*.

While the systems and methods of the present disclosure may generate and transmit vehicle location data and/or insurance-related data, which may include or be representative of personal information and individual insurance policy information, the systems and methods may include an "opt-in" feature that enables any given individual to select a content of any insurance policy related data. Furthermore, the systems and methods may automatically exclude all personal information and individual insurance policy information from the vehicle location and/or insurance-related data. For example, the systems and methods may generate vehicle location information and/or insurance-related data that only includes an indication as to whether any given vehicle is equipped with an emergency vehicle warning device, such as to avoid transmitting or broadcasting personal or sensitive information unnecessarily.

It should be noted that currently, the National Weather Service is able to send automatic alerts to, for example, cellular telephones to warn the associated users of bad weather. These warnings are sent automatically (no subscription necessary) to "WEA-capable" phones (see, e.g., http://www.noaa.gov/features/03_protecting/wireless_e-mergency_alerts.html). In one embodiment, a method similar to the National Weather Service may be developed that would alert drivers in the path of EMS vehicles.

The present embodiments may also be used to notify drivers of tornados, hail storms, wind storms, rain, snow, heavy rain, heavy snow, wind, thunder storms, hurricanes, etc. in the vicinity of their vehicle and/or along their route of travel. For instance, based upon GPS coordinate comparison of a weather event and a traveling vehicle, a warning or alternate route to a driver may be provided (such as "Tornado Watch 15 miles ahead, take alternate route, and seek shelter"; "Heavy Snow 30 miles ahead, take alternate route"; "Thunders storms 5 miles ahead moving East at 40 mph"; etc.

In one embodiment, an autonomous vehicle may be in direct or indirect wireless communication, or data transmission with a smart emergency vehicle. As the smart emergency vehicle travels to a scene of an insurance-related event, such as a vehicle accident, fire, medical emergency, or police emergency, the smart emergency vehicle may broadcast or transmit (via a vehicle-mounted transceiver) certain information to vehicles directly in front of it and/or along a route of travel of the emergency vehicle. The information transmitted may include a position, destination, speed, heading, route, GPS location, and/or other information associated with the smart emergency vehicle. A vehicle controller (having an associated transceiver) of an autonomous vehicle may receive that information and compare it with the position, destination, speed, heading, route, GPS location, and/or other information of the autonomous vehicle.

Based upon the comparison, an autonomous vehicle controller may generate an audible or visual alert announcing the presence or route of the emergency vehicle, and/or provide recommendations and/or alternate routes that may avoid the emergency vehicle (such as "Move over to the shoulder"; "Turn right and take alternate route along Main St. to destination"; "Pull off to the side street"; "Pull into the shopping mall parking mall to let emergency vehicles pass," etc.) Moreover, the autonomous vehicle may be automatically controlled, based upon the comparison, to avoid the emergency vehicle. Also, if an emergency vehicle alert or other alert is received by a non-autonomous vehicle, the non-autonomous vehicle may automatically turn off a vehicle entertainment system (e.g., loud music), and then may provide recommendations or directions to a driver of the non-autonomous vehicle.

As noted, the systems and methods of the present disclosure may facilitate automatically getting autonomous vehicles out of the way of emergency vehicles. The present embodiments may alert drivers of non-autonomous vehicles not to head/drive in a direction of emergency vehicles, and/or may provide intelligent routing based upon wireless communication and/or data transmission indicating the real-time or current location of emergency vehicles, accident scenes, house fires, hospital locations, police scenes, etc. In some aspects, a virtual navigation map may pop up on a mobile device, smart vehicle display screen, or vehicle-mounted navigation unit to provide just-in-time vehicle re-routing to get around or avoid the route of emergency vehicles, vehicle accidents, etc.

Emergency vehicles may include transponders or transceivers that broadcast to cell towers, mobile devices, and/or vehicles. The transponders or transceivers may also broadcast data to non-autonomous vehicles and/or autonomous vehicles, such as via point-to-point (P2P) wireless communication and/or vehicle-to-vehicle (V2V) wireless communication. Warnings may be generated at the emergency vehicles themselves, back-end cites, at processors associated with the cell towers, mobile devices, vehicles, smart vehicles, and/or autonomous vehicles based upon the data received from the emergency vehicles (such as data associated with current emergency vehicle location, emergency vehicle route, emergency vehicle destination, etc.). The warnings may include information about vehicle accidents, accident locations, suggest alternate routing, and/or provide other forewarnings. Automation of common procedures, triggered by emergency vehicle warnings, may reduce computer processing times, memory requirements and/or related facilities. Using the methods and systems, insurance customers may be automatically warned of emergency vehicle (s) in the proximity of the customer's location, focused on relevant information to the emergency vehicle(s), and/or provided with reduced risk to the insurance customer and reductions in related insurance agreement information.

Exemplary System for Generating Emergency Vehicle Warning Data and/or Insurance-Related Data Turning to FIG. 1A, a high-level block diagram of an exemplary system 100 for automatically controlling operation of an autonomous vehicle based upon emergency vehicle warning data may include both hardware and software applications, as well as various data communications channels for communicating data between the various hardware and software components, as is described in detail herein. The system 100 may be roughly divided into front-end components 102 and back-end components 104. The front-end components 102 may obtain information regarding an autonomous vehicle 108 (e.g., an autonomous car, an autonomous truck, an autonomous motorcycle, etc.) that is being automatically operated and regarding a context and surrounding environment (e.g., emergency vehicles, other autonomous vehicles, other vehicles, obstacles, etc.) in which the autonomous vehicle 108 is being automatically operated. One or more on-board computers 110 and/or one or more mobile devices 112 that are included in the front-end components 102 and disposed at the autonomous vehicle 108 may utilize this information to, for example, notify or alert the driver of the autonomous vehicle 108, notify or alert other drivers and other vehicles 115a-115n that are operating in the surrounding environment, automatically change an operating behavior of the autonomous vehicle 108 and/or of any one or more of the other vehicles 115a-115n. The one or more on-board computers 110 may be permanently or removably installed in the autonomous vehicle 108, and the one or more mobile devices 112 may be disposed at and transported by the autonomous vehicle 108, for example.

Generally speaking, the on-board computer 110 may be an on-board computing device capable of performing various functions relating to autonomous vehicle automatic operation. That is, the on-board computer 110 may be particularly configured with particular elements to thereby be able to perform functions relating to autonomous vehicle automatic operations. Further, the on-board computer 110 may be installed by the manufacturer of the autonomous vehicle 108, or as an aftermarket modification or addition to the autonomous vehicle 108. In FIG. 1A, although only one on-board computer 110 is depicted, it should be understood that in some embodiments, a plurality of on-board computers 110 (which may be installed at one or more locations within the autonomous vehicle 108) may be used. However, for ease of reading and not for limitation purposes, the on-board computing device or computer 110 is referred to herein using the singular tense.

The mobile device 112 may be transported by the autonomous vehicle 108 and may be, for example, a personal computer or personal electronic device (PED), cellular phone, smart phone, tablet computer, smart watch, wearable electronics, or a dedicated vehicle monitoring or control device which may be releasably attached to the autonomous vehicle 108. Although only one mobile device 112 is illustrated in FIG. 1A, it should be understood that in some embodiments, a plurality of mobile devices 112 may be included in the system 100. For ease of reading and not for limitation purposes, though, the mobile device 112 is referred to herein using the singular tense.

Further, it is noted that, in some embodiments, the on-board computer 110 may operate in conjunction with the mobile device 112 to perform any or all of the functions described herein as being performed on-board the autonomous vehicle 108. In other embodiments, the on-board computer 110 may perform all of the on-board vehicle functions described herein, in which case either no mobile device 112 is being transported by the autonomous vehicle 108, or any mobile device 112 that is being transported by the autonomous vehicle 108 is ignorant or unaware of vehicle and driver operations. In still other embodiments, the mobile device 112 may perform all of the onboard autonomous vehicle functions described herein. Still further, in some embodiments, the on-board computer 110 and/or the mobile device 112 may perform any or all of the functions described herein in conjunction with one or more back-end components 104. For example, in some embodiments or under certain conditions, the mobile device 112 and/or on-board computer 110 may function as thin-client devices that outsource some or most of the processing to one or more of the back-end components 104.

At any rate, the on-board computing device 110 and/or the mobile device 112 disposed at the autonomous vehicle 108 may communicatively interface with one or more on-board sensors 118 that are disposed on or within the autonomous vehicle 108 and that may be utilized to monitor the autonomous vehicle 108 and the environment in which the autonomous vehicle 108 is operating. That is, the one or more on-board sensors 118 may sense conditions associated with the autonomous vehicle 108 and/or associated with the environment in which the autonomous vehicle 108 is operating, and may collect data indicative of the sensed conditions. In some configurations, at least some of the on-board sensors 118 may be fixedly disposed at various locations on the autonomous vehicle 108. Additionally or alternatively, at least some of the on-board sensors may be incorporated within or connected to the on-board computer 110. Still additionally or alternatively, in some configurations, at least some of the on-board sensors 118 may be included on or within the mobile device 112. Whether disposed at or on the autonomous vehicle 108 or disposed at or on a mobile device 112 being transported by the autonomous vehicle 108, though, the one or more of the sensors 118 are generally referred to herein as "on-board sensors 118," and the data collected by the on-board sensors 118 is generally referred to herein as "sensor data," "on-board sensor data," or "vehicle sensor data." The on-board sensors 118 may communicate respective sensor data to the on-board computer 110 and/or to the mobile device 112, and the sensor data may be processed using the on-board computer 110 and/or the mobile device 112 to determine when the autonomous vehicle 108 is in operation as well as determine information regarding the autonomous vehicle 108 and/or the vehicle's operating behavior. In some situations, the on-board sensors 118 may communicate respective sensor data indicative of the environment in which the autonomous vehicle 108 is operating.

As discussed above, at least some of the on-board sensors 118 associated with the autonomous vehicle 108 may be removably or fixedly disposed within or at the autonomous vehicle 108, and further may be disposed in various arrangements and at various locations to sense and provide information. The sensors 118 that are installed at the autonomous vehicle 108 may include one or more of a GPS unit, a radar unit, a LIDAR unit, an ultrasonic sensor, an infrared sensor, some other type of electromagnetic energy sensor, an inductance sensor, a camera, an accelerometer, an odometer, a system clock, a gyroscope, a compass, a geo-location or geo-positioning unit, a location tracking sensor, a proximity sensor, a tachometer, and/or a speedometer, to name a few. Some of the on-board sensors 118 (e.g., GPS, accelerometer, or tachometer units) may provide sensor data indicative of, for example, the autonomous vehicle's location, speed, position acceleration, direction, responsiveness to controls, movement, etc. Other sensors 118 that are disposed at the autonomous vehicle 108 may be directed to the interior or passenger compartment of the autonomous vehicle 108, such as cameras, microphones, pressure sensors, weight sensors, thermometers, or similar sensors to monitor any passengers, operations of instruments included in the autonomous vehicle, operational behaviors of the autonomous vehicle, and/or conditions within the autonomous vehicle 108. For example, on-board sensors 118 directed to the interior of the autonomous vehicle 108 may provide sensor data indicative of, for example, in-cabin temperatures, in-cabin noise levels, data from seat sensors (e.g., indicative of whether or not a person is using a seat, and thus the number of passengers being transported by the autonomous vehicle 108), data from seat belt sensors, data regarding the operations of user controlled devices such as windshield wipers, defrosters, traction control, mirror adjustment, interactions with on-board user interfaces, etc. Some of the sensors 118 disposed at the autonomous vehicle 108 (e.g., radar, LIDAR, camera, or other types of units that operate by using electromagnetic energy) may actively or passively scan the environment external to the autonomous vehicle 108 for obstacles (e.g., emergency vehicles, other vehicles, buildings, pedestrians, trees, gates, barriers, animals, etc.) and their movement, weather conditions (e.g., precipitation, wind, visibility, or temperature), roadways, road conditions (e.g., lane markings, potholes, road material, traction, or slope), road topography, traffic conditions (e.g., traffic density, traffic congestion, etc.), signs or signals (e.g., traffic signals, speed limits, other jurisdictional signage, construction signs, building signs or numbers, or control gates), and/or other information indicative of the vehicle's environment. Information or data that is generated or received by the on-board sensors 118 may be communicated to the on-board computer 110 and/or to the mobile device 112, for example.

In some embodiments of the system 100, the front-end components 102 may communicate collected sensor data to the back-end components 104 (e.g., via a network 120). For example, at least one of the on-board computer 110 or the mobile device 112 may communicate with the back-end components 104 via the network 120 to allow the back-end components 104 to record collected sensor data and information regarding autonomous vehicle usage. The network 120 may include a proprietary network, a secure public internet, a virtual private network, and/or some other type of network, such as dedicated access lines, plain ordinary telephone lines, satellite links, cellular data networks, combinations of these and/or other types of networks. The network 120 may utilize one or more radio frequency communication links to communicatively connect to the autonomous vehicle 108, e.g., utilize wireless communication links 122 and 125 to communicatively connect with mobile device 112 and on-board computer 110, respectively. Where the network 120 comprises the Internet or other data packet network, data communications may take place over the network 120 via an Internet or other suitable data packet communication protocol. In some arrangements, the network 120 additionally or alternatively includes one or more wired communication links or networks.

The back-end components 104 include one or more servers or computing devices, which may be implemented as a server bank or cloud computing system 130, and is interchangeably referred to herein as a "remote computing system 130." The remote computing system 130 may include one or more computer processors adapted and configured to execute various software applications and components of the system 100, in addition to other software applications. The remote computing system 130 may further include or be communicatively connected to one or more data storage devices or entities 132, which may be adapted to store data related to the operation of the autonomous vehicle 108, the environment and context in which the autonomous vehicle 108 is operating, and/or other information. For example, the one or more data storage devices 132 may be implemented as a data bank or a cloud data storage system, at least a portion of which may be locally accessed by the remote computing system 130 using a local access mechanism such as a function call or database access mechanism, and/or at least a portion of which may be remotely accessed by the remote computing system 130 using a remote access mechanism such as a communication protocol. At any rate, the remote computing system 130 may access data stored in the one or more data storage devices 132 when executing various functions and tasks associated with the present disclosure.

To communicate with the remote computing system 130 and other portions of the back-end components 104, the front-end components 102 may include one or more communication components 135*a*, 135*b* that are configured to transmit information to and receive information from the back-end components 104 and, in some embodiments, transmit information to and receive information from other external sources, such as emergency vehicles, other vehicles and/or infrastructure or environmental components disposed within the autonomous vehicle's environment. The one or more communication components 135*a*, 135*b* may include one or more wireless transmitters or transceivers operating at any desired or suitable frequency or frequencies. Different wireless transmitters or transceivers may operate at different frequencies and/or by using different protocols, if desired. In an example, the mobile device 112 may include a respective communication component 135*a* for sending or receiving information to and from the remote computing system 130 via the network 120, such as over one or more radio frequency links or wireless communication channels 122 which support a first communication protocol (e.g., GSM, CDMA, LTE, one or more IEEE 802.11 Standards such as Wi-Fi, WiMAX, BLUETOOTH, etc.). Additionally or alternatively, the on-board computer 110 may operate in conjunction with an on-board transceiver or transmitter 135*b* that is disposed at the autonomous vehicle 108 (which may, for example, be fixedly attached to the autonomous vehicle 108) for sending or receiving information to and from the remote computing system 130 via the network 120, such as over one or more radio frequency links or wireless communication channels 125 which support the first communication protocol and/or a second communication protocol. In some embodiments, the on-board computer 110 may operate in conjunction with the mobile device 112 to utilize the communication component 135*a* of the mobile device 112 and the link 122 to deliver information to the back-end components 104. In some embodiments, the on-board computer 110 may operate in conjunction with the mobile device 112 to utilize the communication component 135*b* of the autonomous vehicle 108 and the link 125 to deliver information to the back-end components 104. In some embodiments, both communication components 135*a*, 135*b* and their respective links 122, 125 may be utilized by the on-board computer 110 and/or the mobile device 112 to communicate with the back-end components 104.

Accordingly, either one or both of the mobile device 112 or on-board computer 110 may communicate with the network 120 over the links 122 and/or 125. Additionally, in some configurations, the mobile device 112 and on-board computer 110 may communicate with one another directly over a link 138, which may be a wireless or wired link.

In some embodiments of the system 100, the on-board computer 110 and/or the on-board mobile device 112 of the autonomous vehicle 108 may communicate with respective on-board computers and/or mobile devices disposed at one or more other vehicles 115*a*-115*n* (e.g., emergency vehicles, other autonomous vehicles, or other vehicles), either directly or via the network 120. For example, the on-board computer 110 and/or the mobile device 112 disposed at the autonomous vehicle 108 may communicate with other vehicles' respective on-board computers and/or mobile devices via the network 120 and one or more of the communication components 135*a*, 135*b* by using one or more suitable wireless communication protocols (e.g., GSM, CDMA, LTE, one or more IEEE 802.11 Standards such as Wi-Fi, WiMAX, BLUETOOTH, etc.). In some configurations, the on-board computer 110 may communicate with a particular vehicle 115*a*-115*n* directly in a peer-to-peer (P2P) manner via one or more of the communication components 135*a*, 135*b* and the direct wireless communication link 140, which may utilize, for example, a Wi-Fi direct protocol, a BLUETOOTH or other short range communication protocol, an ad-hoc cellular communication protocol, or any other suitable wireless communication protocol.

In some embodiments, the system 100 may include one or more environmental communication components or devices, examples of which are depicted in FIG. 1A by references 142*a*, 142*b*, 142*c*, that are used for monitoring the status of one or more infrastructure components 145 and/or for receiving data generated by other sensors 148 that are associated with the autonomous vehicle 108 and disposed at locations that are off-board the autonomous vehicle 108. As generally referred to herein, with respect to the autonomous vehicle 108, "off-board sensors" or "environmental sensors" 148 are sensors that are not being transported by the autonomous vehicle 108. The data collected by the off-board sensors 148 is generally referred to herein as "sensor data," "off-board sensor data," or "environmental sensor data" with respect to the autonomous vehicle 108.

At least some of the off-board sensors 148 may be disposed on or at the one or more infrastructure components 145 or other types of components that are fixedly disposed within the environment in which the autonomous vehicle 108 is traveling. Infrastructure components 145 may include roadways, bridges, traffic signals, gates, switches, crossings, parking lots or garages, toll booths, docks, hangars, or other similar physical portions of a transportation system's infrastructure, for example. Other types of infrastructure components 145 at which off-board sensors 148 may be disposed may include a traffic light, a street sign, a railroad crossing signal, a construction notification sign, a roadside display configured to display messages, a billboard display, a parking garage monitoring device, etc. Off-board sensors 148 that are disposed on or near infrastructure components 145 may generate data relating to the presence and location of obstacles or of the infrastructure component 145 itself, weather conditions, traffic conditions, operating status of the infrastructure component 145, and/or behaviors of various vehicles 108, 115a-115n, pedestrians, and/or other moving objects within the vicinity of the infrastructure component 145, for example.

Additionally or alternatively, at least some of the off-board sensors 148 that are communicatively connected to the one or more infrastructure devices 145 may be disposed on or at one or more other vehicles 115a-115n operating in the vicinity of the autonomous vehicle 108. As such, a particular sensor that is disposed on-board another vehicle 115a may be viewed as an off-board sensor 148 with respect to the autonomous vehicle 108.

At any rate, the one or more environmental communication devices 142a-142c that are associated with the autonomous vehicle 108 may be communicatively connected (either directly or indirectly) to one or more off-board sensors 148, and thereby may receive information relating to the condition and/or location of the infrastructure components 145, of the environment surrounding the infrastructure components 145, and/or of other vehicles 115a-115n or objects within the environment of the autonomous vehicle 108. In some embodiments, the one or more environmental communication devices 142a-142c may receive information from the autonomous vehicle 108, while, in other embodiments, the environmental communication device(s) 142a-142c may only transmit information to the autonomous vehicle 108. As previously discussed, at least some of the environmental communication devices may be locally disposed in the environment in which the autonomous vehicle 108 is operating, e.g., as denoted by references 142a, 142b. In some embodiments, at least some of the environmental communication devices may be remotely disposed, e.g., at the back-end 104 of the system 100 as denoted by reference 142c. In some embodiments, at least a portion of the environmental communication devices may be included in (e.g., integral with) one or more off-board sensors 148, e.g., as denoted by reference 142b. In some configurations, at least some of the environmental communication devices 142 may be included or integrated into the one or more on-board communication components 135a, 135b, the on-board computer 110, and/or the mobile device 112 of surrounding vehicles 115a-115n (not shown).

In addition to receiving information from the on-board sensors 118 and off-board sensors 148 associated with the autonomous vehicle 108, the on-board computer 110 at the autonomous vehicle 108 may directly or indirectly control the operation of the autonomous vehicle 108 according to various fully- or semi-autonomous operation features. The autonomous operation features may include software applications or modules implemented by the on-board computer 110 to generate and implement control commands to control the steering, braking, or motive power of the autonomous vehicle 108. To facilitate such control, the on-board computer 110 may be communicatively connected to control components of the autonomous vehicle 108 by various electrical or electromechanical control components (not shown). When a control command is generated by the on-board computer 110, it may thus be communicated to the control components of the autonomous vehicle 108 to effect a control action. In embodiments involving fully autonomous vehicles, the autonomous vehicle 108 may be operable only through such control components (not shown). In other embodiments, the control components may be disposed within or supplement other vehicle operator control components (not shown), such as steering wheels, accelerator or brake pedals, or ignition switches.

Further, the on-board computer 110 may control one or more operations of the autonomous vehicle 108 when the vehicle is operating non-autonomously. For example, the on-board computer 110 may automatically detect respective triggering conditions and automatically activate corresponding features such as traction control, windshield wipers, headlights, braking, etc.

Figure 1B:
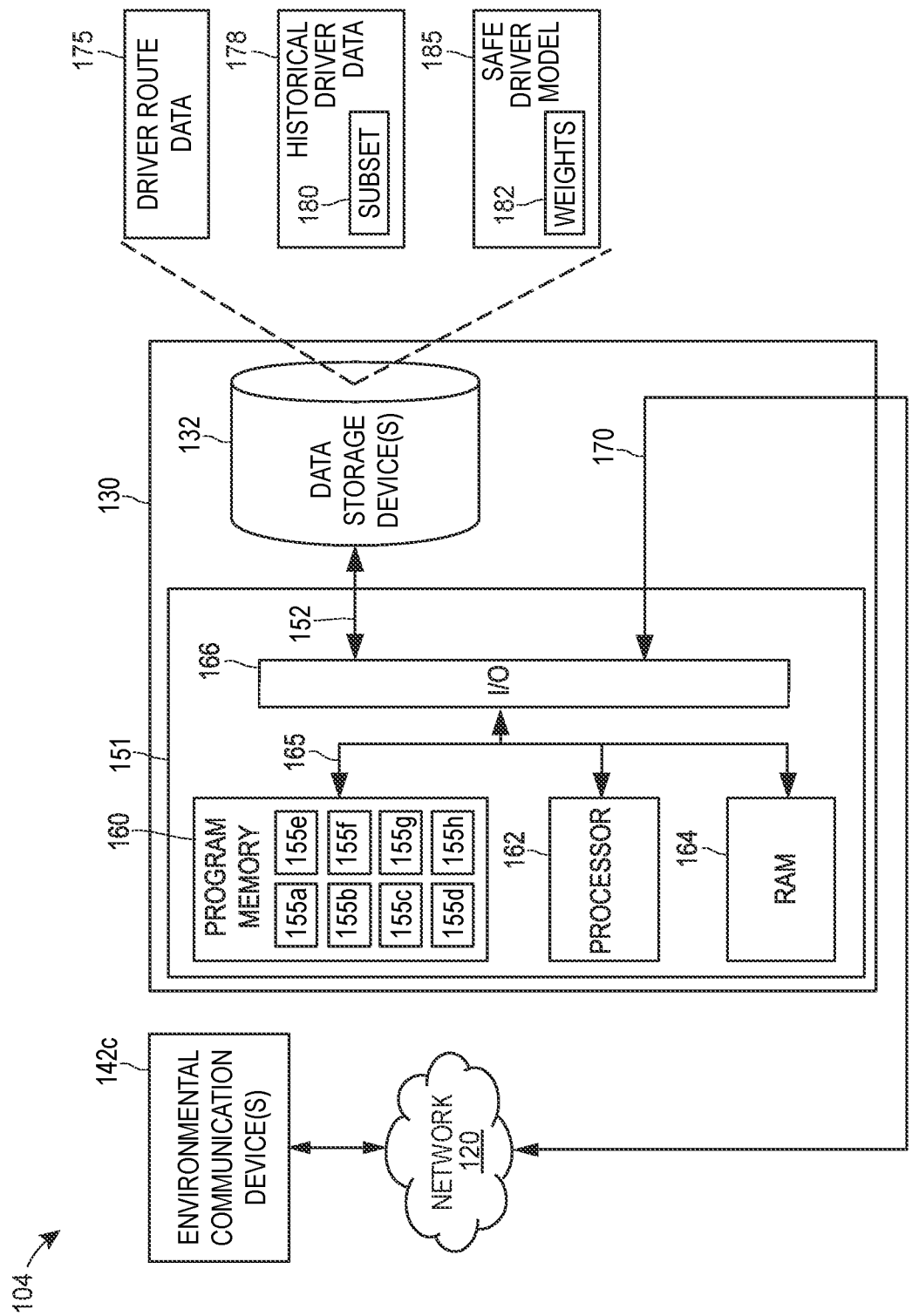
FIG. 1B illustrates a more detailed block diagram of the back-end components of the exemplary system shown in FIG. 1A.

With reference to FIG. 1B, a more detailed block diagram of the example back-end components 104 of the system 100 may include a remote computing system 130 having a controller 150 that is operatively connected to the one or more data storage devices or entities 132 via a link 152, which may be a local or a remote link 152. It should be noted that, while not shown, additional data storage devices or entities may be linked to the controller 150 in a known manner. For example, separate databases may be used for various types of information, such as autonomous operation feature information, vehicle accidents, road conditions, vehicle insurance policy information, driver performance, or vehicle use information. Additional databases (not shown) may be communicatively connected to the remote computing system 130 via the network 120, such as databases maintained by third parties (e.g., weather, construction, or road network databases). The controller 150 may include one or more memories 160 (e.g., one or more program memories 160), one or more processors 162 (which may be called a microcontroller or a microprocessor), one or more random-access memories (RAMs) 164, and an input/output (I/O) circuit 166, all of which may be interconnected via an address/data bus 165. It should be appreciated that although only one microprocessor 162 is shown, the controller 150 may include multiple microprocessors 162. Similarly, the memory of the controller 150 may include multiple RAMs 164 and multiple program memories 160. Although the I/O circuit 166 is shown as a single block, it should be appreciated that the I/O circuit 166 may include a number of different types of I/O circuits. The RAM 164 and program memories 160 may be implemented as semiconductor memories, magnetically readable memories, optically readable memories, or biologically readable memories, for example. Generally speaking, the RAM 164 and/or the program memories 160 may respectively include one or more non-transitory, computer-readable storage media. The controller 150 may also be operatively connected to the network 120 via a link 170.

The remote computing system 130 may further include a number of software applications 153-158 stored in a program memory 160. The various software applications on the remote computing system 130 may include, for example, a vehicle monitoring application 153 for receiving sensor data (whether from on-board sensors 118 and/or from off-board sensors 148) indicative of the operating behavior of the autonomous vehicle 108 and/or an environmental monitoring application 154 for receiving data (whether from on-board sensors 118, off-board sensors 148, and/or third party data feeds) indicative of changing environmental and contextual conditions in which the autonomous vehicle 108 is operating, a vehicle performance evaluation application 155 for determining a performance of the autonomous vehicle 108 during the changing environmental and contextual conditions, and a real-time communication application 156 for communicating information and/or instructions to the autonomous vehicle 108 (e.g., to the on-board computing device 110, the mobile device 112, and/or another computing device disposed at the autonomous vehicle 108), to other vehicles 115a-115n, and/or to other computing systems. Other applications at the remote computing system 130 may include, for example, an application for supporting autonomous and/or semi-autonomous vehicle operations 157 and/or one or more other applications 158 which may support vehicle operations (whether fully-, semi- or non-autonomous), vehicle context determination, and/or evaluation of autonomous vehicle performance. Generally speaking, the applications 153-158 may perform one or more functions related to automatic operation of the autonomous vehicle 108 and responses (temporal and otherwise) to changes in the context. For example, one or more of the applications 153-158 may perform at least a portion of any of the methods described herein.

The various software applications 153-158 may be executed on the same computer processor 162 or on different computer processors. Further, while the various applications 153-158 are depicted as separate applications, two or more of the applications 153-158 may be integrated as an integral application, if desired. In some embodiments, at least one of the applications 153-158 may be implemented in conjunction with another application (not shown) that is stored and executed at the remote computing system 130, such as a navigation application.

Additionally, it is noted that although the system 100 for automatic operation of an autonomous vehicle 100 is shown in FIGS. 1A and 1B to include one autonomous vehicle 108, one mobile device 112, one on-board computer 110, and one remote computing system 130, it should be understood that different numbers of autonomous vehicles 108, mobile devices 112, on-board computers 110, emergency vehicles 115a-n and/or remote computing devices or servers 130 may be utilized. For example, the system 100 may include a plurality of servers 130 and hundreds or thousands of mobile devices 112 or on-board computers 110, all of which may be interconnected via the network 120. Furthermore, the database storage or processing performed by the one or more servers 130 may be distributed among a plurality of servers 130 in an arrangement known as "cloud computing." This configuration may provide various advantages, such as enabling near real-time uploads and downloads of information as well as periodic uploads and downloads of information. This may in turn support a thin-client embodiment of the mobile device 112 or on-board computer 110 discussed herein. Further, in some embodiments, any number of other vehicles 115a-115n may be communicatively connected to and/or included in the system 100 (e.g., via the network 120).

Figure 1C:
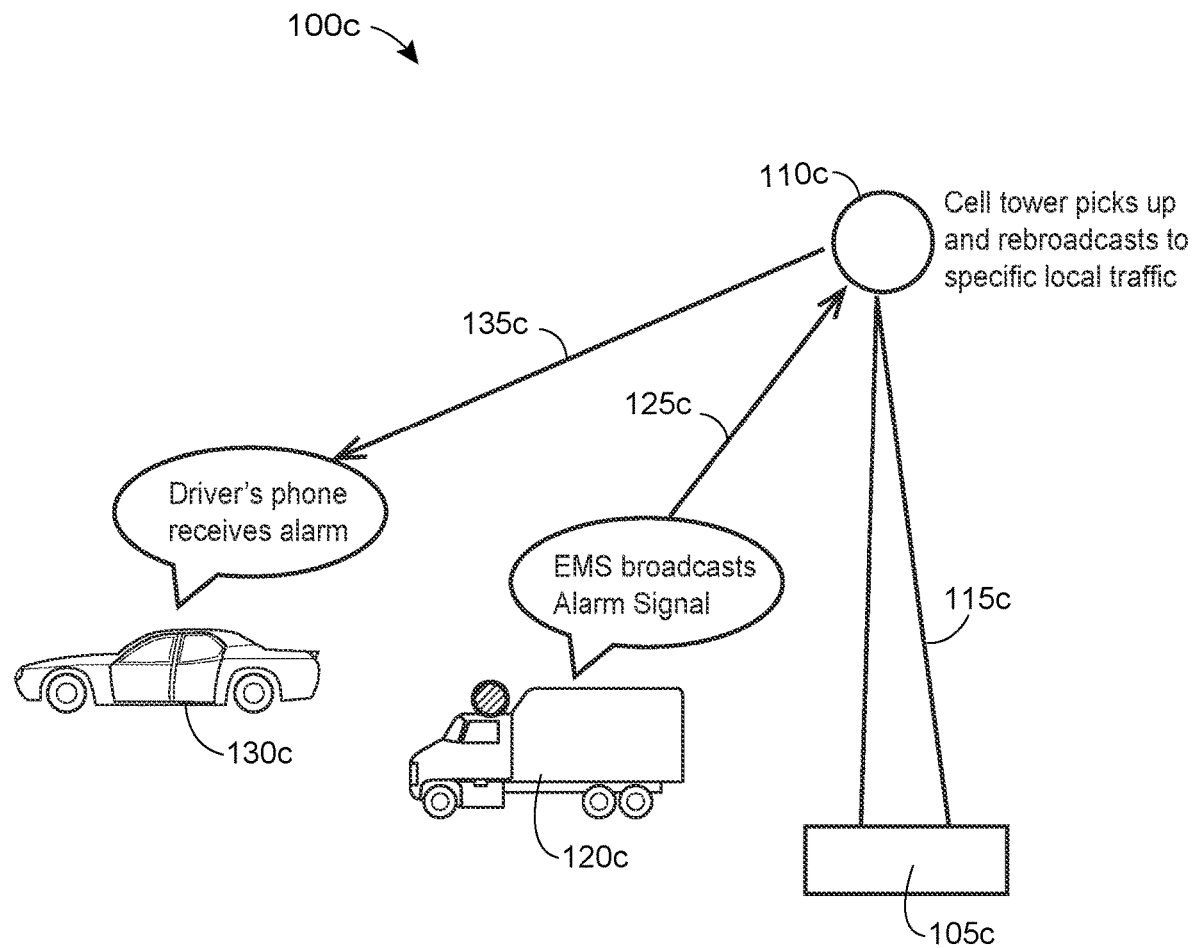
FIG. 1C depicts another exemplary system for automatically operating an autonomous vehicle based upon emergency vehicle warning data.

Turning to FIG. 1C, a system for generating emergency vehicle warning data and/or insurance-related data 100c may include a remote location 105c, a communication system 110c, at least one emergency vehicle 120c, and/or at least one autonomous vehicle 130c. While only one emergency vehicle 120c and only one autonomous vehicle 130c are depicted in FIG. 1C, it should be understood that any number of emergency vehicles 120c and any number of autonomous vehicles 130c may be included in a system for generating emergency vehicle warning data 100c. The emergency vehicles 120c and autonomous vehicles 130c may be in direct wireless communication or data transmission with one another, such as via peer-to-peer (P2P) communication, and/or in indirect wireless communication or data transmission with one another, such as by using a cell tower or remote server/processor associated with a remote location 105c as a relay.

In any event, an emergency call may be received by, for example, a dispatcher located, for example, at the remote location 105c. In response to the emergency call, the dispatcher may assign a particular emergency response vehicle to respond to the emergency call. In conjunction with assigning the emergency vehicle, the dispatcher may enter emergency vehicle data into, for example, a remote emergency management services device (e.g., remote EMS computing device 210b of FIG. 2B). The emergency vehicle data may be representative of, for example, an emergency vehicle origination location data, an emergency vehicle route data, and/or an emergency vehicle destination location data.

The dispatcher may transmit the emergency vehicle data to the emergency vehicle 120c via a first communication link 115c and a second communication link 125c. The first communication link 115c and the second communication link 125c may combine to define, for example, a peer-to-peer communication link. Alternatively, the first communication link 115c and the second communication link 125c may combine with the communication system 110c to define, for example, a cellular telephone network.

In response to receiving the emergency vehicle data from the remote location, the emergency vehicle 120c may begin transmitting emergency vehicle data. For example, the emergency vehicle 120c may transmit emergency vehicle data back to the remote location 105, via the first communication link 115c and the second communication link 125c, and/or to the autonomous vehicle 130c via the second communication link 125c and a third communication link 135c. Similar, to the first communication link 115c and the second communication link 125c, the second communication link 125c and the third communication link 135c may combine to define, for example, a peer-to-peer communication link. Alternatively, the second communication link 125c and the third communication link 135c may combine with the communication system 110c to define, for example, a cellular telephone network.

As an alternative to the remote location 105c and/or the emergency vehicle 120c transmitting emergency vehicle data, emergency vehicle warning data may be generated, using a processor of a computing device (e.g., processor 275b or processor 250b, respectively), based upon the emergency vehicle data, and the remote location 105c and/or the emergency vehicle 120c may transmit/receive the emergency vehicle warning data.

In an additional embodiment, the emergency vehicle 120c may wirelessly communicate current location, route, speed, destination, type of emergency, and/or other information to a smart roadside sign. The smart roadside sign may display messages to vehicles (e.g., autonomous vehicles 130c) passing by, such as displaying road or travel conditions that an autonomous vehicle 130c is approaching, and/or the status or route of an emergency vehicle 120c approaching or otherwise in the vicinity. The smart roadside sign may display or otherwise indicate radio stations that travelers may tune their radios to in order to hear further updates, and/or current locations of emergencies (e.g., vehicle accidents) and/or emergency vehicles 120c. Additionally or alternatively, the smart roadside sign may wirelessly communicate emergency vehicle 120c information (e.g., the information received directly or indirectly from an emergency vehicle 120c) directly or indirectly to autonomous vehicles 130c or mobile devices of travelers to enhance road safety and awareness of emergency vehicles 120c.

Figure 2A:
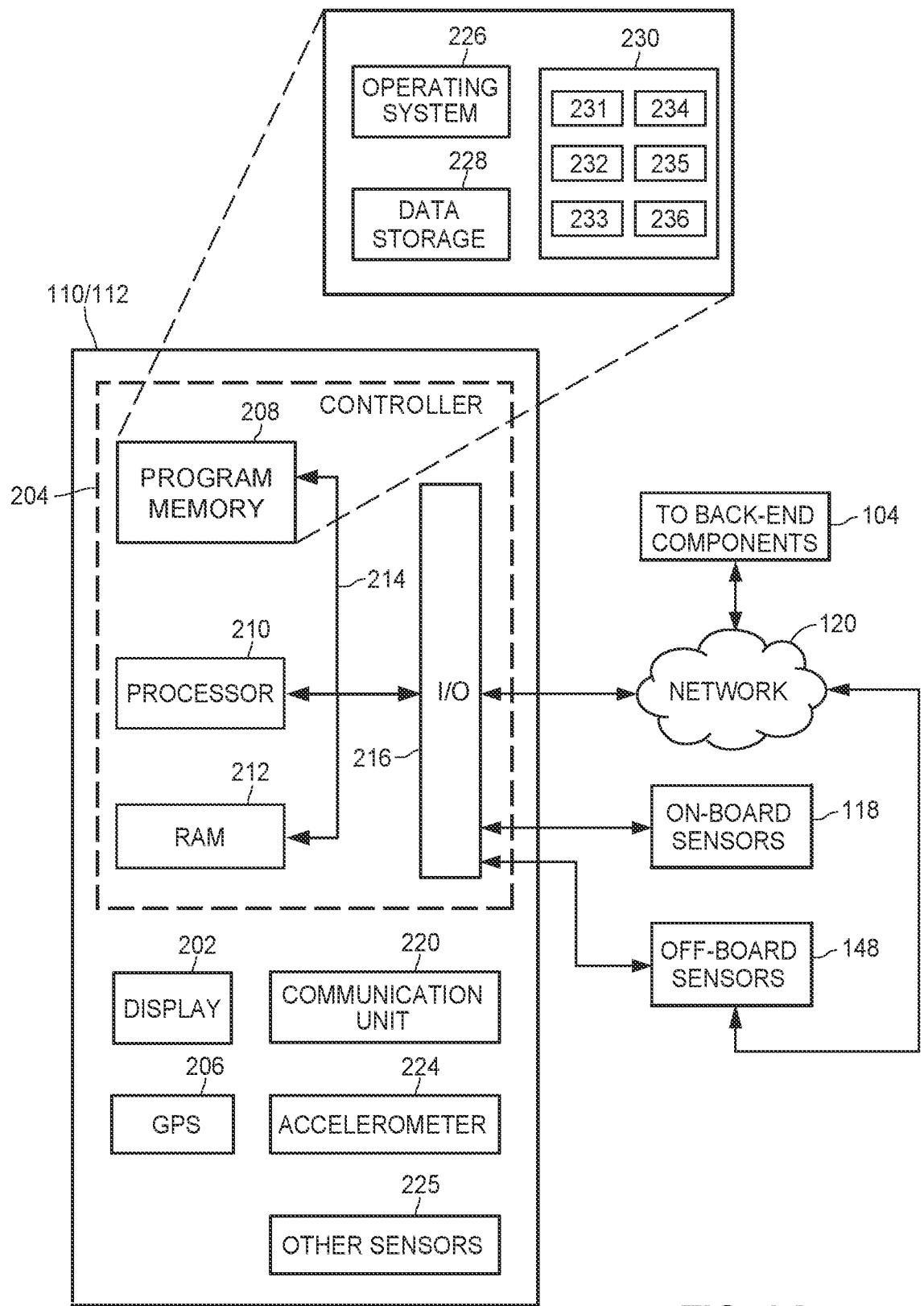
FIG. 2A illustrates a high-level block diagram of an exemplary autonomous vehicle device or on-board computing device that may operate in conjunction with any one of the systems of FIGS. 1A, 1B and 1C.

Exemplary System for Generating Emergency Vehicle Warning Data and/or Insurance-Related Data With reference to FIG. 2A, a block diagram of an exemplary mobile device 112 or an exemplary on-board computer 110, consistent with the system 100, may include a display 202, a GPS or other suitable geo-location unit 206, a communication unit 220, an accelerometer 224, one or more additional sensors 225, a user-input device (not shown), and/or a controller 204, which may be similar to the controller 150 of the remote computing system 130. In some embodiments, the mobile device 112 and on-board computer 110 may be integrated into a single device, or either may perform the functions of both. The on-board computer 110/mobile device 112 may interface with one or more on-board sensors 118 that are disposed at the autonomous vehicle 108 (but that are separate from the device 110/112) to receive information regarding the autonomous vehicle 108 and its environment. Additionally, the on-board computer 110/mobile device 112 may interface with one or more off-board sensors 148 to receive information regarding the autonomous vehicle 108 and its environment (e.g., information regarding emergency vehicles, emergency vehicle data, etc.).

Similar to the controller 150, the controller 204 may include a program memory 208, one or more microcontrollers or microprocessors (MP) 210, a RAM 212, and an I/O circuit 216, all of which are interconnected via an address/data bus 214. The program memory 208 includes an operating system 226, a data storage 228, and/or a plurality of software applications 230. The operating system 226, for example, may include one of a plurality of general purpose or mobile platforms, such as the Android™, iOS®, or Windows® systems, developed by Google Inc., Apple Inc., and Microsoft Corporation, respectively. Alternatively, the operating system 226 may be a custom operating system designed for the on-board computer 110. The data storage 228 may include data such as user profiles and preferences, application data for the plurality of applications 230, and other data related to evaluating driver performance. In some embodiments, the controller 204 may also include, or otherwise be communicatively connected to, other data storage mechanisms (e.g., one or more hard disk drives, optical storage drives, solid state storage devices, etc.) that reside within the autonomous vehicle 108 and/or at the remote system 130.

As discussed with reference to the controller 150, it should be appreciated that although FIG. 2A depicts only one microprocessor 210, the controller 204 may include multiple microprocessors 210. Similarly, the memory of the controller 204 may include multiple RAMs 212 and multiple program memories 208. Although FIG. 2A depicts the I/O circuit 216 as a single block, the I/O circuit 216 may include a number of different types of I/O circuits. The controller 204 may implement the RAMs 212 and the program memories 208 as semiconductor memories, magnetically readable memories, or optically readable memories, for example. Generally speaking, the RAMs 212 and/or the program memories 208 may respectively include one or more non-transitory, computer-readable storage media.

The one or more processors 210 of the device 110/112 may be adapted and configured to execute any of one or more of the plurality of software applications 230 residing in the program memory 204, in addition to other software applications. The various software applications 230 of the device 110/112 may include, for example, a vehicle monitoring application 231 for receiving (whether from on-board sensors 118 and/or from off-board sensors 148) sensor data indicative of the operating behavior of the autonomous vehicle 108, an environmental monitoring application 232 for receiving (whether from on-board sensors 118, off-board sensors 148, and/or third party data feeds) data indicative of changing environmental (e.g., information regarding emergency vehicles, emergency vehicle data, etc.) and contextual conditions in which the autonomous vehicle 108 is operating, an automatic autonomous vehicle operation application 233 for determining a performance of the autonomous vehicle 108 during the changing environmental and contextual conditions, and a real-time communication application 234 for communicating information and/or instructions to the autonomous vehicle 108 (e.g., to another computing device or system disposed at the autonomous vehicle 108), to other vehicles 115a-115n, to the remote computing system 130, to other back-end components 104 of the system 100 such as the environmental communication device 142c, and/or to other computing systems. Other applications that are executed at the device 110/112 may include, for example, an application for supporting autonomous and/or semi-autonomous vehicle operations 235 and/or one or more other applications 236 which may support vehicle operations (whether fully-, semi-, or non-autonomous), and/or context determination (e.g., information regarding emergency vehicles, emergency vehicle data, etc.). Generally speaking, the applications 230 may perform one or more functions related to automatic autonomous vehicle operation based upon emergency vehicles (e.g., information regarding emergency vehicles, emergency vehicle data, etc.) operating in the environment surrounding the autonomous vehicle 108 and the autonomous vehicle responses (temporal and otherwise) to changes in the context. For example, one or more of the applications 230 may perform at least a portion of any of the methods described herein. In some embodiments, one or more of the applications 230 may operate in conjunction with one or more of the applications 153-158 at the remote computing system 130 to perform one or more functions related to automatic autonomous vehicle operation based upon the context (e.g., information regarding emergency vehicles, emergency vehicle data, etc.) in which the autonomous vehicle 108 is operating and the autonomous vehicle responses (temporal and otherwise) to changes in the context. For example, one or more of the applications 231-236 at the device 110/112 may be implemented as a thin-client that operates in conjunction with one or more of the applications 153-158 at the remote computing system.

The various software applications 230 may be executed on the same computer processor 210 or on different computer processors. Further, while the various applications 231-236 are depicted as separate applications, two or more of the applications 231-236 may be integrated as an integral application, if desired. In some embodiments, at least one of the applications 231-236 may be implemented in conjunction with another application (not shown) that is stored and executed at the device 110/112, e.g., a navigation application, a user interface application, etc.

In addition to the communicative connections to the on-board sensors 118 that are disposed at the autonomous vehicle 108 but not at, on, or within the device 110/112 itself, the device 110/112 may include additional on-board sensors 118 that are integral with the device 110/112, such as the GPS unit 206 and/or the accelerometer 224, which may provide information regarding the operation of the autonomous vehicle 108. Such integral sensors 118 may further include one or more sensors of a sensor array 225, which may include, for example, one or more cameras, additional accelerometers, gyroscopes, magnetometers, barometers, thermometers, proximity sensors, light sensors, Hall Effect sensors, etc. The one or more sensors of the sensor array 225 may be positioned to determine telematics data regarding the speed, force, heading, direction, and/or other parameters associated with movements of the autonomous vehicle 108.

Furthermore, the communication unit 220 of the device 110/112 may communicate with other vehicles 115a-115n (e.g., emergency vehicles, other autonomous vehicles, other vehicles, etc.), infrastructure or environmental components 142, 145, back-end components 104, or other external sources of information to transmit and receive information relating to automatic autonomous vehicle operation based upon emergency vehicle operation (e.g., information regarding emergency vehicles, emergency vehicle data, etc.). For example, the communication unit 220 may be included in or may include one or more of the communication components 135a, 135b shown in FIG. 1A. Additionally or alternatively, the communication unit 220 may be included in or may include an instance of the environmental communication component 142 shown in FIG. 1A. The communication unit 220 may communicate with the external sources via the network 120 or via any suitable wireless communication protocol network, such as wireless telephony (e.g., GSM, CDMA, LTE, etc.), Wi-Fi (802.11 standards), WiMAX, Bluetooth, infrared or radio frequency communication, etc. Further, the communication unit 220 may provide input signals to the controller 204 via the I/O circuit 216. The communication unit 220 may also transmit sensor data, device status information, control signals, or other output from the controller 204 to one or more sensors 118 within the autonomous vehicle 108, mobile devices 112, on-board computers 110, off-board sensors 148, environmental communication devices 142, and/or remote servers 130.

Further, the mobile device 112 or the on-board computer 110 may include a user-input device (not shown) for receiving instructions or information from the vehicle operator, such as settings, selections, acknowledgements, etc. The user-input device (not shown) may include a "soft" keyboard that is displayed on the display 202, an external hardware keyboard communicating via a wired or a wireless connection (e.g., a Bluetooth keyboard), an external mouse, a microphone, or any other suitable user-input device. The user-input device (not shown) may also include a microphone capable of receiving user voice input.

Figure 2B:
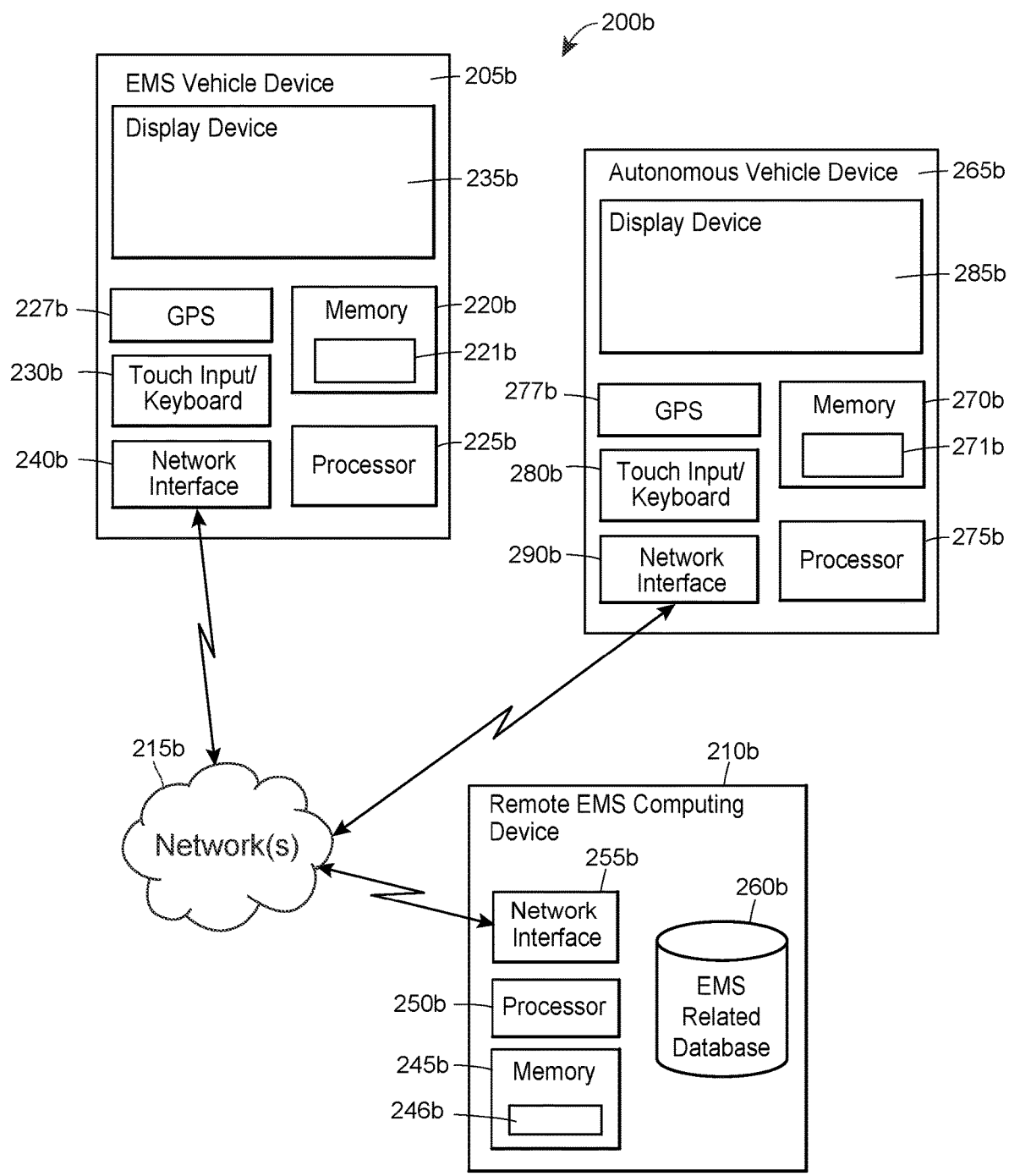
FIG. 2B depicts a high-level block diagram for another exemplary computer system for automatically operating an autonomous vehicle based upon emergency vehicle warning data.

Turning to FIG. 2B, a computer system for generating emergency vehicle warning data 200b may include an emergency vehicle device 205b and an autonomous vehicle device 265b in communication with a remote emergency management services computer device 210b via a communications network 215b. The computer system 200b may implement communications between the emergency vehicle device 205b, the autonomous vehicle device 265b, and the remote emergency management services device 210b to provide, for example, emergency vehicle warning data to an emergency management services related database 260b. For example, the computer system 200b may acquire emergency vehicle data from, for example, a user of an emergency vehicle device 205b and/or autonomous vehicle data from, for example, a user of an autonomous vehicle device 265b. As described in detail herein, the computer system 200 may automatically generate emergency vehicle warning data based upon, for example, emergency vehicle data and/or autonomous vehicle data. The autonomous vehicle device 265b may automatically control operation of an associated autonomous vehicle based upon the emergency vehicle warning data. For example, the autonomous vehicle device 265b may automatically control the autonomous vehicle to avoid traveling on a roadway that would encounter an associated emergency vehicle.

For clarity, only one emergency vehicle device 205b, one autonomous vehicle device 265b, and one remote emergency management services device 210b are depicted in FIG. 2B. While FIG. 2B depicts only one emergency vehicle device 205b, one autonomous vehicle device 265b, and one remote emergency management services device 210b, it should be understood that any number of emergency vehicle devices 205b, any number of autonomous vehicle devices 265b, and any number of remote emergency management services computing devices may be supported, and that each emergency vehicle device 205b, each autonomous vehicle device 265b, and each remote emergency management services computing device 210b may be any appropriate computing device, such as a mobile telephone, a personal data assistant, a tablet or a lap-top computer.

An emergency vehicle device 205b may include a memory 220b and a processor 225b for storing and executing, respectively, a module 221b. The module 221b, stored in the memory 220b as a set of computer-readable instructions, may be related to an application for generating emergency vehicle warning data, and/or insurance-related data, based upon emergency vehicle data and/or autonomous vehicle data that, when executed on a processor 225b, causes data representative of emergency vehicle warning data and/or insurance-related data based upon emergency vehicle data and/or autonomous vehicle data to be stored in the memory 220b. As described in detail herein, the module 221b may facilitate interaction between an associated emergency vehicle device 205b, an autonomous vehicle device 265b, and/or a remote emergency management services computing device 210b. The processor 225b, further executing the module 221b, may facilitate communications between a remote emergency management services computing device 210b, an emergency vehicle device 205b, and/or an autonomous vehicle device 265b via a network interface 240b and a network 215b.

An emergency vehicle device 205b may include a global positioning system (GPS) 227b. An emergency vehicle device 205b may include a display device 235b which may be any type of electronic display device such as a liquid crystal display (LCD), a light emitting diode (LED) display, a plasma display, a cathode ray tube (CRT) display, or any other type of known or suitable electronic display. A display device 235b may exhibit a display which depicts a user interface for configuring an emergency vehicle device 205b to communicate with an autonomous vehicle device 265b and/or a remote emergency management services computing device 210b. An emergency vehicle device 205b may include a user input device 230b, such as a touch input/keyboard/pointing device (e.g., a mouse) that provides a mechanism for a user of the emergency vehicle device 205b to launch an emergency vehicle device insurance application and, for example, to interact with a system for generating emergency vehicle warning data, and/or insurance-related data, based upon emergency vehicle data and/or autonomous vehicle data. The user input device 230b may be configured as an integral part of a display device 235b, such as a touch screen display device.

The network interface 240b may be configured to facilitate communications between an emergency vehicle device 205b, an autonomous vehicle device 265b, and/or a remote emergency management services computing device 210b via any wireless communication network 215b, including for example a peer-to-peer communications link, wireless LAN, MAN or WAN, WiFi, the Internet, or any combination thereof. Moreover, an emergency vehicle device 205b may be communicatively connected to a remote emergency management services device 210b via any suitable communication system, such as via any publicly available or privately owned communication network, including those that use wireless communication structures, such as wireless communication networks, including for example, a peer-to-peer communications link, wireless LANs and WANs, satellite and cellular telephone communication systems, etc. An emergency vehicle device 205b may cause, for example, emergency vehicle data and/or emergency vehicle warning data to be transmitted to, and stored in, for example, a remote emergency management services computing device 210b memory 245b and/or a remote emergency management services related database 260b.

An autonomous vehicle device 265b may include a memory 270b and a processor 275b for storing and executing, respectively, a module 271b. The module 271b, stored in the memory 270b as a set of computer-readable instructions, may be related to an application for generating autonomous vehicle warning data, and/or insurance-related data, based upon autonomous vehicle data and/or emergency vehicle data that, when executed on a processor 275b, causes data representative of autonomous vehicle warning data and/or insurance-related data based upon emergency vehicle data and/or autonomous vehicle data to be stored in the memory 270b. As described in detail herein, the module 271b may facilitate interaction between an associated autonomous vehicle device 265b, an emergency vehicle device 205b, and/or a remote emergency management services computing device 210b. The processor 275b, further executing the module 271b, may facilitate communications between a remote emergency management services computing device 210b, an autonomous vehicle device 265b, and/or an emergency vehicle device 205b via a network interface 290b and a network 215b.

An autonomous vehicle device 265b may include a global positioning system (GPS) 277b. An autonomous vehicle device 265b may include a display device 285b which may be any type of electronic display device such as a liquid crystal display (LCD), a light emitting diode (LED) display, a plasma display, a cathode ray tube (CRT) display, or any other type of known or suitable electronic display. A display device 285b may exhibit a display which depicts a user interface for configuring an autonomous vehicle device 265b to communicate with an emergency vehicle device 205b and/or a remote emergency management services computing device 210b. An autonomous vehicle device 265b may include a user input device 280b, such as a touch input/keyboard/pointing device (e.g., a mouse) that provides a mechanism for a user of the autonomous vehicle device 265b to launch an autonomous vehicle device insurance application and, for example, to interact with a system for generating emergency vehicle warning data, and/or insurance-related data, based upon emergency vehicle data and/or autonomous vehicle data. The user input device 280 may be configured as an integral part of a display device 285b, such as a touch screen display device.

The network interface 290b may be configured to facilitate communications between an autonomous vehicle device 265b, an emergency vehicle device 205b, and/or a remote emergency management services computing device 210b via any wireless communication network 215b, including for example a peer-to-peer communications link, wireless LAN, MAN or WAN, WiFi, the Internet, or any combination thereof. Moreover, an autonomous vehicle device 265b may be communicatively connected to a remote emergency management services device 210b via any suitable communication system, such as via any publicly available or privately owned communication network, including those that use wireless communication structures, such as wireless communication networks, including for example, a peer-to-peer communications link, wireless LANs and WANs, satellite and cellular telephone communication systems, etc. An autonomous vehicle device 265b may cause, for example, autonomous vehicle data to be transmitted to, and stored in, for example, a remote emergency management services computing device 210b memory 245b and/or a remote emergency management services related database 260b.

A remote emergency management services computing device 210b may include a memory 245b and a processor 250b for storing and executing, respectively, a module 246b. The module 246b, stored in the memory 245b as a set of computer-readable instructions, may facilitate applications related to generating emergency vehicle warning data, and/or insurance-related data, based upon emergency vehicle data and/or autonomous vehicle data. The module 246b may also facilitate communications between the remote emergency management services computing device 210b, an emergency vehicle device 205b, and/or an autonomous vehicle device 265b via a network interface 255b and the network 215b, and other functions and instructions.

A remote emergency management services device 210b may be communicatively coupled to an emergency management services related database 260b. While the emergency management services related database 260b is shown in FIG. 2B as being communicatively coupled to the remote emergency management services device 210b, it should be understood that the emergency management services related database 260b may be located within separate remote servers (or any other suitable computing devices) communicatively coupled to the remote emergency management services computer device 210b. Optionally, portions of emergency management services related database 260b may be associated with memory modules that are separate from one another, such as a memory 220b of an emergency vehicle device 205b and/or an autonomous vehicle device 265b.

Figure 3:
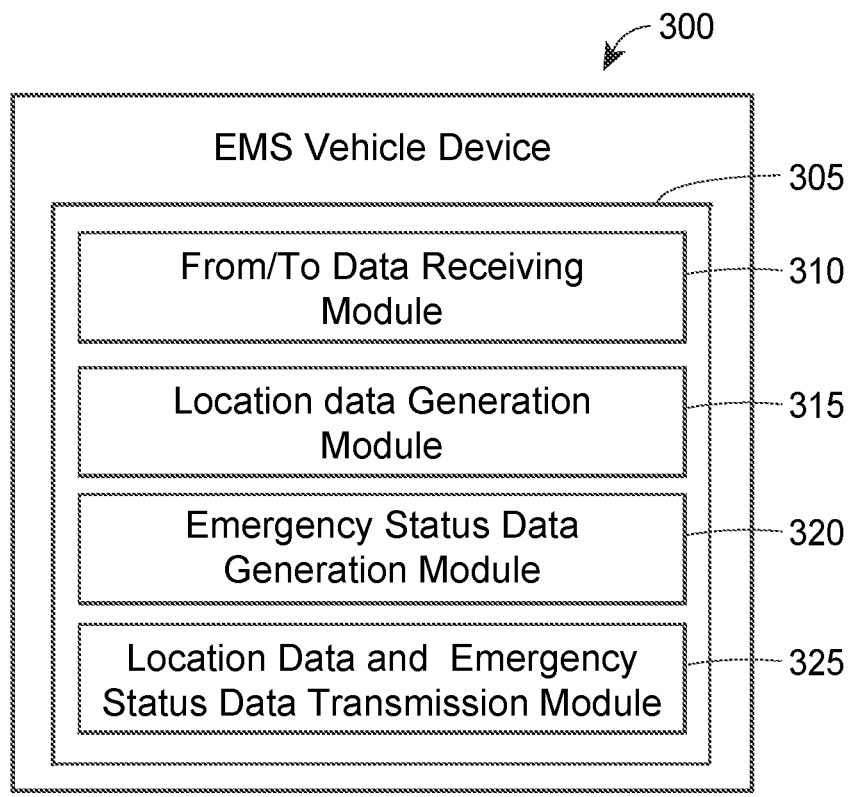
FIG. 3 depicts a block diagram for an exemplary emergency vehicle device or on-board computing device that may operate in conjunction with any one of the systems of FIGS. 1A, 1B, 1C and 2B.

Exemplary Emergency Vehicle Device for Generating Emergency Vehicle Data and/or Emergency Vehicle Warning Data Turning to FIG. 3, an emergency vehicle device 300 may include a from/to data receiving module 310, a location data generation module 315, an emergency status data generation module 320, and/or a location and emergency status data transmission module 325 stored on, for example, a memory 305. The emergency vehicle device 300 may be similar to the emergency vehicle device 205b of FIG. 2B, and/or may include additional, less, or alternate functionality, including that discussed elsewhere herein.

Figure 4:
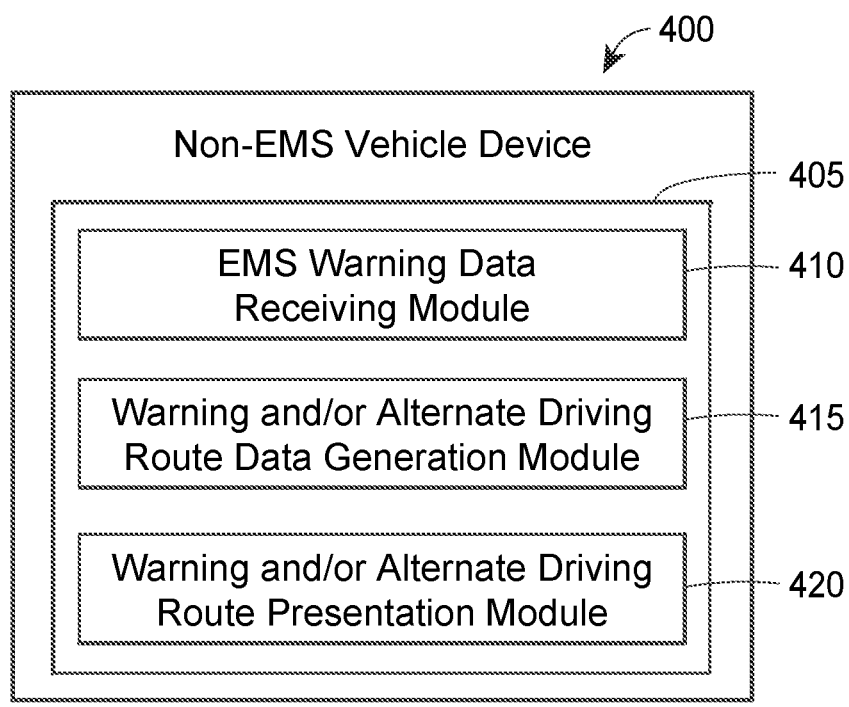
FIG. 4 depicts a block diagram for an exemplary autonomous vehicle device or on-board computing device that may operate in conjunction with any one of the systems of FIGS. 1A, 1B, 1C and 2B.

Exemplary Autonomous Vehicle Device for Generating Autonomous Vehicle Data and/or Emergency Vehicle Warning Data Turning to FIG. 4, an autonomous vehicle device 400 may include an emergency vehicle warning data receiving module 410, a warning and/or alternate driving route data generation module 415, and/or a warning and/or alternate driving route presentation module 420 stored on, for example, a memory 405. The autonomous vehicle device 400 may be similar to the autonomous vehicle device 265b of FIG. 2B, and/or may include additional, less, or alternate functionality, including that discussed elsewhere herein.

Figure 5:
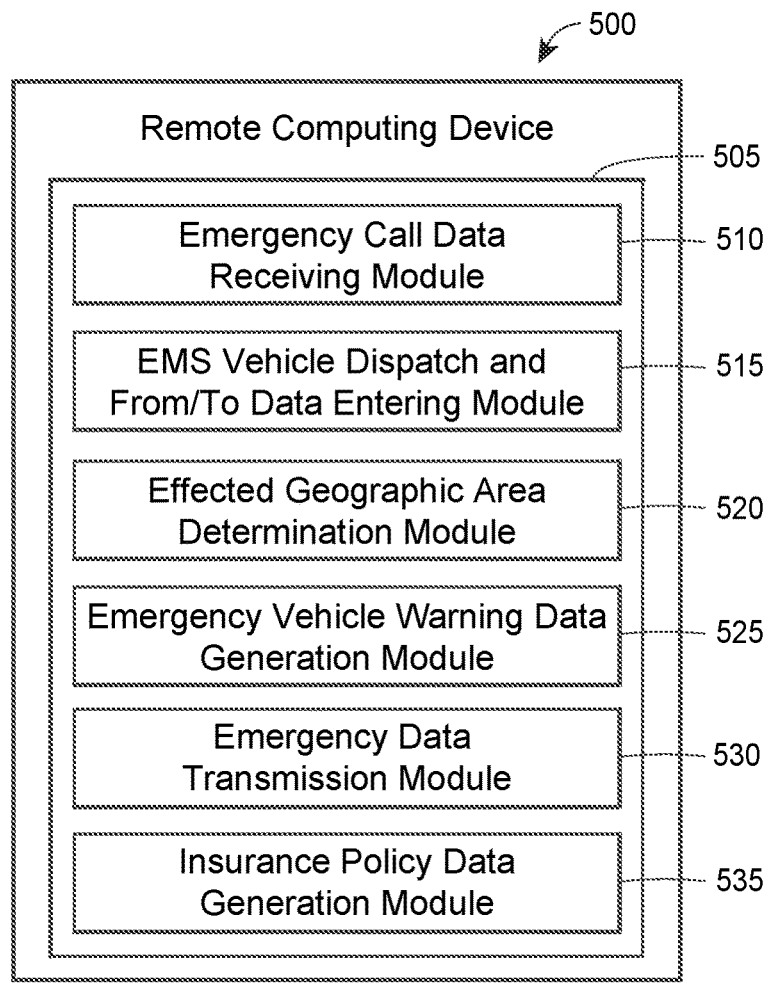
FIG. 5 depicts a block diagram for an exemplary remote emergency management services computing device for generating emergency vehicle warning data and/or insurance policy related data based upon the emergency vehicle warning data.

Exemplary Remote Emergency Management Services Computing Device for Generating Emergency Vehicle Warning Data, and Insurance-Related Data With reference to FIG. 5, a remote emergency management services computing device 500 may include an emergency call data receiving module 510, an emergency vehicle dispatch and from/to data entering module 515, an effected geographic area determination module 520, an emergency vehicle warning data generation module 525, an emergency vehicle warning data transmission module 530, and/or an insurance-related data generation module 535 stored on, for example, a memory 505. The remote emergency management services computing device 500 may be similar to, for example, the remote emergency management services computing device 210b of FIG. 2B, and/or may include additional, less, or alternate functionality, including that discussed elsewhere herein.

Figure 6:
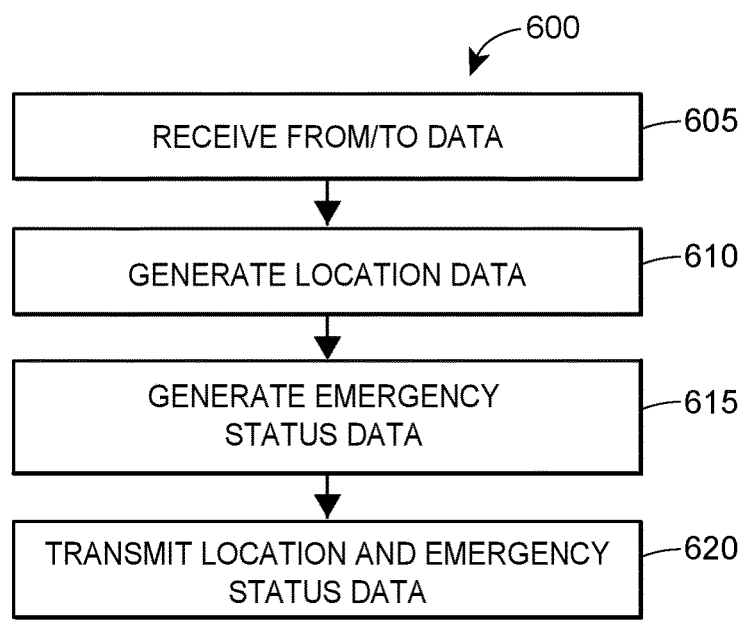
FIG. 6 depicts a flow diagram for an exemplary method for generating emergency vehicle data and/or emergency vehicle warning data.

Exemplary Method for Generating Emergency Vehicle Data and/or Emergency Vehicle Warning Data Turning to FIG. 6, a method of automatically generating emergency vehicle data 600 may be implemented by a processor (e.g., processor 225b of emergency vehicle device 205b of FIG. 2B) executing, for example, modules 310-320 of FIG. 3. In particular, processor 225b may execute the from/to data receiving module 310 to cause the processor 225b to receive to/from data from, for example, a processor of a remote emergency management services computer (e.g., processor 250b) (block 605). The processor 225b may execute the location data generation module 315 to cause the processor 225b to generate emergency vehicle location data based upon, for example, a global positioning system (GPS) 227b signal (block 610). The processor 225b may execute the emergency status data generation module 320 to cause the processor 225b to generate emergency status data (block 615). The emergency status data may be indicative of whether an associated emergency vehicle is, for example, currently in motion, or is currently stationary.

The processor 225b may execute the location and emergency status data transmission module 325 to cause the processor 225b to transmit emergency vehicle data to, for example, a processor of a remote emergency management services computing device (e.g., processor 250b) and/or to a processor of an autonomous vehicle device (e.g., processor 275b) (block 620). The emergency vehicle data may be based upon, for example, the location data and/or the emergency status data. For example, the emergency vehicle data may be representative of an emergency vehicle origination location, an emergency vehicle current location, an emergency vehicle route, and/or an emergency vehicle destination location.

Additionally, or alternatively, the processor 225b may execute an emergency vehicle warning data generation module 525 to generate emergency vehicle warning data (and/or alternate routing information) based upon, for example, emergency vehicle data and/or autonomous vehicle data. When the processor 225b generates emergency vehicle warning data (and/or alternate routing information), the processor 225b may transmit the emergency vehicle warning data in addition to, or in lieu of, the emergency vehicle data, to, for example, a processor of a remote emergency management services computing device (e.g., processor 250b) and/or to a processor of an autonomous vehicle device (e.g., processor 275b) (block 620). The method may include additional, fewer, or alternate actions, including those discussed elsewhere herein.

Figure 7:
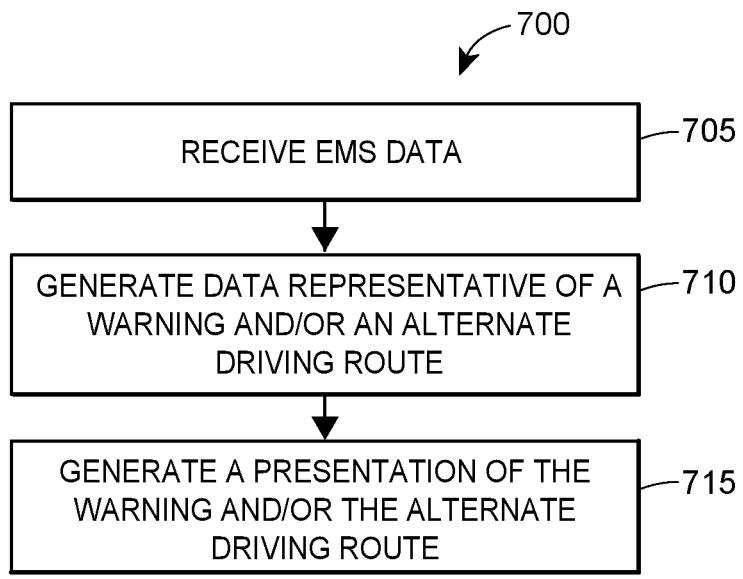
FIG. 7 depicts a flow diagram for an exemplary method for generating autonomous vehicle data and/or automatic operation of an autonomous vehicle based upon emergency vehicle warning data.

Exemplary Method for Generating Autonomous Vehicle Data, Emergency Vehicle Warning Data, and Automatic Control of an Associated Autonomous Vehicle Based Upon the Emergency Vehicle Warning Data With reference to FIG. 7, a method of automatically generating autonomous vehicle data 500 may be implemented by a processor (e.g., processor 275b of autonomous vehicle device 265b of FIG. 2B) executing, for example, modules 410-420 of FIG. 4. In particular, processor 275b may execute an emergency vehicle warning data receiving module 410 to receive emergency vehicle warning data from, for example, a processor of a remote emergency management services computing device (e.g., processor 250b) and/or a processor of an emergency vehicle device (e.g., processor 225b) (block 705). The processor 275b may execute a warning and/or alternate driving route data generation module 415 to cause the processor 275b to generate warning data and/or alternate driving route data based upon the emergency vehicle warning data (block 710). The processor 275b may automatically control the associated autonomous vehicle based upon the warning and/or alternate driving route data to, for example, avoid an emergency vehicle that is operating within an environment of the autonomous vehicle.

Additionally, or alternatively, the processor 275b may execute a warning and/or alternate driving route presentation module 420 to cause the processor 275b to generate a presentation of a warning based upon the warning data and/or a presentation of an alternate driving route based upon the alternate driving route data (block 715). The presentation of the warning may be, for example, a visual alarm, a motion alarm (e.g., vibration of a seat or steering wheel) and/or an audible alarm, and may be indicative of an emergency vehicle being in a geographic area of the autonomous vehicle.

The presentation of the alternate driving route may be, for example, a visual presentation and/or an audible presentation, and may be indicative of a driving route that will avoid intersection with an emergency vehicle. The processor 275b may execute a module (e.g., a module location data generation module 315) to cause the processor 275b to generate autonomous vehicle location data based, for example, upon an output of a sensor (e.g., GPS 277b of FIG. 2B). The method may include additional, fewer, or alternate actions, including those discussed elsewhere herein.

Figure 8:
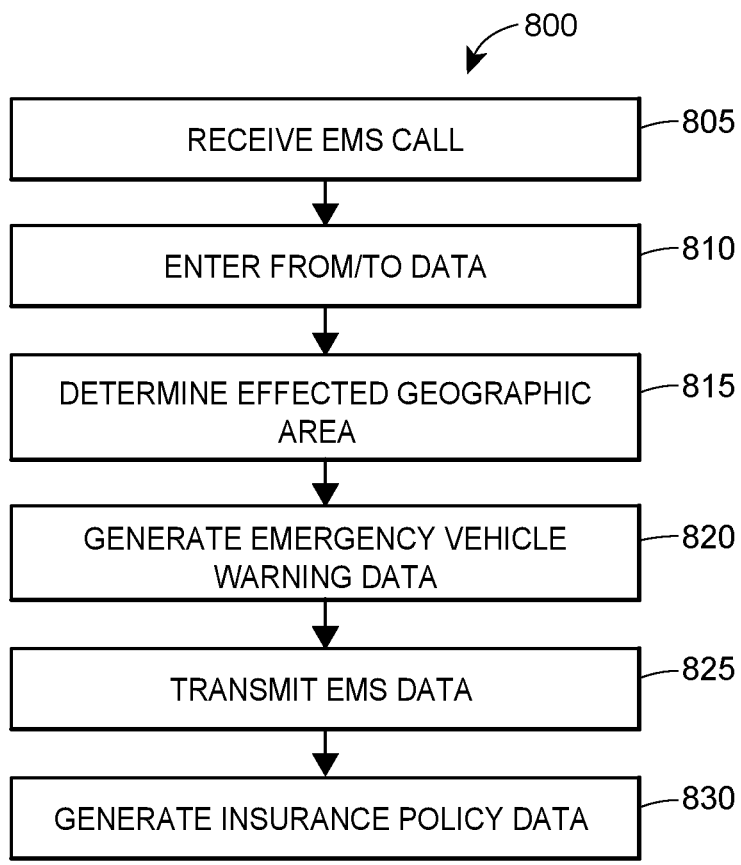
FIG. 8 depicts a flow diagram for an exemplary method for generating emergency vehicle warning data and/or insurance policy related data based upon the emergency vehicle warning data.

Exemplary Method for Generating Emergency Vehicle Warning Data and/or Insurance-Related Data Turning to FIG. 8, a method of automatically generating emergency vehicle warning data and/or insurance-related data 800 may be implemented by a processor (e.g., processor 250b of remote emergency management services computing device 210b of FIG. 2B) executing, for example, modules 510-535 of FIG. 5. In particular, the processor 250b may execute the emergency call data receiving module 510 to cause the processor 250b to receive emergency call data (block 805). For example, the emergency call data may be automatically entered into the remote emergency management services computing device 210b when the individual seeking emergency services calls into a remote location (e.g., remote location) and enters information via, for example, a telephone. The emergency call data may be representative of information received by, for example, an emergency management services dispatcher from an individual seeking emergency services (e.g., medical, fire, police, etc.). Alternatively, the processor 250b may execute an emergency management system vehicle dispatch and from/to data entering module 520 such that a dispatcher may enter the emergency call data into, for example, a remote emergency management services computing device (e.g., remote emergency management services computing device 210b of FIG. 2B) via, for example, a user input device (e.g., a keyboard, a touch screen, a voice actuated system, etc.) (block 810).

The processor 250b may execute the effected geographic area determination module 520 to cause the processor 250b to generate effected geographic area data based upon the emergency call data (block 815). The effected geographic area data may be representative of a geographic area in which an emergency vehicle will travel, an emergency vehicle origination location, an emergency vehicle driving route, and/or an emergency vehicle destination location. The processor 250b may execute the emergency vehicle warning data generation module 525 to cause the processor 250b to generate emergency vehicle warning data based upon emergency vehicle data and/or autonomous vehicle data (block 820). The processor 250b may execute the emergency management services data transmission module 530 to cause the processor 250b to transmit emergency vehicle data and/or emergency vehicle warning data to a processor of an autonomous vehicle device (e.g., processor 275b of FIG. 2B) and/or a processor of an emergency vehicle device (e.g., processor 225b of FIG. 2B) (block 825).

The processor 250b may execute an insurance-related data generation module 535 to cause the processor 250b to generate insurance-related data based upon the emergency vehicle data, the autonomous vehicle data, and/or the emergency vehicle warning data (block 830). The insurance-related data may be, for example, representative of whether an emergency vehicle includes an emergency vehicle device (e.g., emergency vehicle device 205b of FIG. 2B) and/or an autonomous vehicle includes an autonomous vehicle device (e.g., autonomous vehicle device 265b of FIG. 2B).

In particular, the insurance-related data may be representative of a lower insurance risk for an emergency vehicle that includes an emergency vehicle device 205b compared to an emergency vehicle that does not include an emergency vehicle device 205b. Furthermore, the insurance-related data may be representative of a lower insurance risk for an autonomous vehicle that includes an autonomous vehicle device 265b compared to an autonomous vehicle that does not include an autonomous vehicle device 205b. The method may include additional, less, or alternate functionality, including that discussed elsewhere herein.

Exemplary Computer Implemented Method

In one aspect, a computer implemented method for generating data representative of an emergency vehicle warning may be provided. The method may include (1) receiving, at a processor of a computing device, emergency vehicle data, in response to the processor executing an emergency vehicle data receiving module. The emergency vehicle data may be representative of at least one of: emergency vehicle origination location data, emergency vehicle current location data, emergency vehicle route data, and emergency vehicle destination location data. The method may also include (2) receiving, at a processor of a computing device, autonomous vehicle data, in response to the processor executing an autonomous vehicle data receiving module. The autonomous vehicle data may be representative of at least one of: autonomous vehicle origination location data, autonomous vehicle current location data, autonomous vehicle route data, and autonomous vehicle destination location data. The method may further include (3) generating, using a processor of a computing device, emergency vehicle warning data, based upon the emergency vehicle data and the autonomous vehicle data, in response to the processor executing an emergency vehicle warning data generation module.

The method may yet further include (4) generating, using a processor of a computing device, insurance-related data, based upon the emergency vehicle warning data, in response to the processor executing an insurance-related data generation module. The insurance-related data may be representative of an insurance risk associated with an autonomous vehicle, and the insurance risk may be lower for an autonomous vehicle that is equipped with an emergency vehicle warning data receiving device. The insurance-related data may be representative of an insurance risk associated with an emergency vehicle, and an insurance risk may be lower for an emergency vehicle that is equipped with an emergency vehicle warning data generation and receiving device.

The method may include (5) transmitting, using a processor of a computing device, emergency vehicle warning data, to an autonomous vehicle, in response to the processor executing an emergency vehicle warning data transmission module. The method may include (6) transmitting, using a processor of a computing device, emergency vehicle data, from an emergency vehicle to an autonomous vehicle, in response to the processor executing an emergency vehicle data transmission module. The method may include additional, less, or alternate actions, including that discussed elsewhere herein.

Exemplary System

A system for generating emergency vehicle warning data (and/or alternate routing data) may be provided. The system may include an emergency vehicle data receiving module stored on a memory that, when executed by a processor of a computing device, may cause the processor to receive emergency vehicle data. The emergency vehicle data may be representative of at least one of: emergency vehicle origination location data, emergency vehicle current location data, emergency vehicle route data, and/or emergency vehicle destination location data. The system may also include an autonomous vehicle data receiving module stored on a memory that, when executed by a processor of a computing device, may cause the processor to receive autonomous vehicle data. The autonomous vehicle data may be representative of at least one of: autonomous vehicle origination location data, autonomous vehicle current location data, autonomous vehicle route data, and/or autonomous vehicle destination location data. The system may further include an emergency vehicle warning data (and/or alternate routing data) generation module stored on a memory that, when executed by a processor of a computing device, may cause the processor to generate emergency vehicle warning data (and/or alternate routing data), based upon the emergency vehicle data and the autonomous vehicle data. The system may include additional, less, or alternate functionality, including that discussed elsewhere herein.

For instance, the system may include an insurance-related data generation module stored on a memory that, when executed by a processor of a computing device, may cause the processor to generate insurance-related data, based upon the emergency vehicle warning data (and/or alternate routing data). The insurance-related data may be representative of an insurance risk associated with an autonomous vehicle, and the insurance risk may be lower for an autonomous vehicle that is equipped with an emergency vehicle warning data (and/or alternate routing data) receiving device, and/or the insurance-related data may be representative of an insurance risk associated with an emergency vehicle, and the insurance risk may be lower for an emergency vehicle that is equipped with an emergency vehicle warning data (and/or alternate routing data) generation and receiving device.

The system may also include an emergency vehicle data transmission module stored on a memory that, when executed by a processor of a computing device, may cause the processor to transmit emergency vehicle data (and/or associated alternate routing data) from an emergency vehicle to an autonomous vehicle via a point-to-point communication link.

The system may also include an emergency vehicle warning data (and/or alternate routing data) transmission module stored on a memory that, when executed by a processor of a computing device, may cause the processor to transmit emergency vehicle warning data (and/or alternate routing data) from a processor of a remote emergency management services device to an autonomous vehicle via a cellular telephone network.

The emergency vehicle data receiving module, the autonomous vehicle data receiving module, and the emergency vehicle warning data generation module may be executed by a processor of a remote emergency management services device, and the remote emergency management services device may include an insurance-related data generation module stored on a memory that, when executed by the processor of the remote emergency management services device, may cause the processor to generate insurance-related data, based upon the emergency vehicle warning data.

Exemplary Computer-Readable Instructions

A non-transitory computer-readable medium storing instructions that, when executed by a processor of a computing device, may cause the processor to automatically generate autonomous vehicle insurance data may include an emergency vehicle data receiving module that, when executed by a processor of a computing device, may cause the processor to receive emergency vehicle data. The emergency vehicle data may be representative of at least one of: emergency vehicle origination location data, emergency vehicle current location data, emergency vehicle route data, and/or emergency vehicle destination location data.

The non-transitory computer-readable medium may also include an autonomous vehicle data receiving module that, when executed by a processor of a computing device, may cause the processor to receive autonomous vehicle data. The autonomous vehicle data may be representative of at least one of: autonomous vehicle origination location data, autonomous vehicle current location data, autonomous vehicle route data, and/or autonomous vehicle destination location data.

The non-transitory computer-readable medium may further include an emergency vehicle warning data generation module that, when executed by a processor of a computing device, may cause the processor to generate emergency vehicle warning data (and/or alternate routing information), based upon the emergency vehicle data and the autonomous vehicle data. The non-transitory computer-readable medium may include an emergency vehicle warning (and/or alternate routing) presentation module that, when executed by a processor of a computing device, may cause the processor to generate an emergency vehicle warning and/or alternate routing) presentation based upon the emergency vehicle warning data. The non-transitory computer-readable medium may include an insurance-related data generation module that, when executed by a processor of a computing device, may cause the processor to generate insurance-related data based upon the emergency vehicle warning data.

The non-transitory computer-readable medium may include an emergency vehicle data transmission module that, when executed by a processor of a computing device, may cause the processor to transmit emergency vehicle data from a first emergency vehicle to a second emergency vehicle. The non-transitory computer-readable medium may include an emergency vehicle warning data transmission module that, when executed by a processor of a computing device, may cause the processor to transmit emergency vehicle warning data from the processor to an emergency vehicle.

Additionally or alternatively, the non-transitory computer-readable medium may include an autonomous vehicle alternate route presentation module that, when executed by a processor of a computing device, may cause the processor to generate an autonomous vehicle alternate route presentation based upon the emergency vehicle warning data.

The non-transitory computer-readable medium may include an effected geographic area data generation module that, when executed by a processor of a computing device, may cause the processor to generate effected geographic area data based upon the emergency vehicle data, and/or an emergency vehicle data warning transmission module that, when executed by a processor of a computing device, may cause the processor to transmit emergency vehicle warning data and/or alternate routing data to autonomous vehicles based upon the effected geographic area data.

The non-transitory computer-readable medium may include an emergency vehicle data transmission module that, when executed by a processor of a computing device, may cause the processor to transmit emergency vehicle data to an autonomous vehicle. The non-transitory computer-readable medium may include an emergency vehicle warning data transmission module that, when executed by a processor of a computing device, may cause the processor to transmit emergency vehicle warning data from the processor to an autonomous vehicle.

Exemplary Computer Implemented Method

In one aspect, a computer implemented method for generating data representative of an emergency vehicle warning and/or alternate vehicle route may be provided. The method may include (1) receiving, generating, or collecting, via or at one or more processors (such as processors associated with an emergency vehicle, autonomous vehicle, and/or remote servers), emergency vehicle data via wireless communication and/or data transmission, wherein the emergency vehicle data is representative of: emergency vehicle origination location data, emergency vehicle current location data, emergency vehicle route data, emergency vehicle destination location data, and/or type of emergency; (2) receiving, generating, or collecting, via or at the one or more processors (such as processors associated with an emergency vehicle, autonomous vehicle, and/or remote servers), autonomous vehicle data, wherein the autonomous vehicle data is representative of: autonomous vehicle origination location data, autonomous vehicle current location data, autonomous vehicle route data, and/or autonomous vehicle destination location data; (3) receiving or generating, via or at the one or more processors (such as processors associated with an emergency vehicle, autonomous vehicle, and/or remote servers), emergency vehicle warning data and/or alternate vehicle route data based upon computer analysis and/or comparison of the emergency and autonomous vehicle data, the alternate vehicle route (i) directing the autonomous vehicle out of the way of the emergency vehicle, (ii) avoids the route of the emergency vehicle, and/or (iii) alleviates an amount that the autonomous vehicle interferes with a route of the emergency vehicle; and/or (4) causing, via or at the one or more processors (such as processors associated with an emergency vehicle, autonomous vehicle, and/or remote servers), the emergency vehicle warning data and/or alternate vehicle route data, to be presented or provided to a driver of the autonomous vehicle to facilitate alleviating potential vehicle accidents between emergency response and autonomous vehicles, and/or shortening emergency response times for emergency vehicles. The method may include additional, less, or alternate actions, including those discussed elsewhere herein, and/or the method may be implemented via a computer system, communication network, one or more processors, and/or computer-executable instructions stored on non-transitory storage media or computer-readable medium.

For instance, the method may include generating, via the one or more processors, insurance-related data for the driver of the autonomous vehicle based upon the driver following recommendations associated with emergency vehicle warnings and/or alternate vehicle routing to avoid emergency vehicles. The insurance-related data may be representative of an insurance risk associated with an autonomous vehicle, and the insurance risk may be lower for an autonomous vehicle that is equipped with an emergency vehicle warning data receiving device. The insurance-related data may be representative of an insurance risk associated with an emergency vehicle, and the insurance risk may be lower for an emergency vehicle that is equipped with an emergency vehicle warning data generation, transmitting, and/or receiving device.

The method may include transmitting, via the one or more processors, emergency vehicle warning data and/or alternate vehicle route data to other vehicles or processors. The one or more processors may be mounted on an autonomous or smart vehicle, and the autonomous or smart vehicle automatically may direct or drive itself to take an alternate vehicle route and/or take self-driving actions that allow the autonomous or smart vehicle avoid the emergency vehicle and/or a route of the emergency vehicle.

Exemplary Vehicle-Mounted Systems

In one aspect, a vehicle-mounted system of a vehicle for generating emergency vehicle warning data and/or alternate route data may be provided. The system may include one or more processors configured to: (1) receive emergency vehicle data, wherein the emergency vehicle data is representative of: emergency vehicle origination location data, emergency vehicle current location data, emergency vehicle route data, emergency vehicle destination location data, and/or alternate routing; (2) collect autonomous vehicle data, the autonomous vehicle data associated with the vehicle and being generated by one or more vehicle-mounted sensors or processors, the autonomous vehicle data is representative: autonomous vehicle origination location data, autonomous vehicle current location data, autonomous vehicle route data, and/or autonomous vehicle destination location data; (3) generate an emergency vehicle warning and/or alternate route based upon computer analysis and/or comparison of the emergency vehicle data and the autonomous vehicle data; and/or (4) present the emergency vehicle warning and/or alternate route to the driver of the vehicle such that driver of the vehicle, or the vehicle itself, may avoid may avoid the route of the emergency vehicle and/or to facilitate shortening response time for emergency vehicles.

The system may include additional, less, or alternate functionality, including that discussed elsewhere herein. For instance, the vehicle may be an autonomous vehicle that automatically avoids the route of the emergency vehicle based upon computer comparison or analysis of the emergency and autonomous vehicle data.

The system may further include an insurance-related data generation module stored on a memory that, when executed by a processor of a computing device, causes the processor to generate insurance-related data, based upon the emergency vehicle warning and/or alternate route data. The insurance-related data may be representative of an insurance risk associated with an autonomous vehicle, and/or the insurance risk may be lower for an autonomous vehicle that is equipped with an emergency vehicle warning data receiving device. Additionally or alternatively, the insurance-related data may be representative of an insurance risk associated with an emergency vehicle, and/or the insurance risk may be lower for an emergency vehicle that is equipped with an emergency vehicle warning data generation and receiving device.

Exemplary Autonomous Vehicle Implemented Method

In one aspect, a computer implemented method for generating data representative of an emergency vehicle warning and/or alternate vehicle route may be provided and/or may be performed by an autonomous vehicle. The method may include (1) receiving, via or at one or more processors associated with an autonomous vehicle, emergency vehicle data via wireless communication and/or data transmission, wherein the emergency vehicle data is representative of: emergency vehicle origination, current location, current speed, current heading, current route, and/or current destination, and/or type of emergency; (2) generating or collecting, via or at the one or more processors associated with the autonomous vehicle, autonomous vehicle data (such as from one or more vehicle-mounted sensors), wherein the autonomous vehicle data is representative of: autonomous vehicle origination, current location, current speed, current heading, current route, and/or current destination; (3) generating, via or at the one or more processors associated with the autonomous vehicle, emergency vehicle warning data and/or alternate vehicle route data based upon computer analysis and/or comparison of the emergency and autonomous vehicle data that is performed by the one or more processors associated with the autonomous vehicle, the alternate vehicle route (i) directing the autonomous vehicle out of the way of the emergency vehicle, (ii) avoids the route of the emergency vehicle, and/or (iii) alleviates an amount that the autonomous vehicle interferes with a route of the emergency vehicle; and/or (4) causing, via or at the one or more processors associated with the autonomous vehicle, the emergency vehicle warning data and/or alternate vehicle route data, to be presented or provided to a driver of the autonomous vehicle to facilitate alleviating potential vehicle accidents between emergency response and autonomous vehicles, and/or shortening emergency response times for emergency vehicles.

The method may further include adjusting an insurance policy, premium, rate, or discount for the autonomous vehicle based upon the autonomous vehicle having the vehicle warning and/or alternate vehicle route generation functionality. The method may include additional, less, or alternate functionality, including that discussed elsewhere herein, and/or the method may be implemented via a computer system, communication network, one or more processors, and/or computer-executable instructions stored on non-transitory storage media or computer-readable medium.

Exemplary Autonomous Vehicle Implemented Method

In one another aspect, a computer implemented method for generating data representative of an emergency response vehicle warning and/or alternate vehicle route may be provided. The method may include (1) receiving, via or at one or more processors mounted on an autonomous vehicle, emergency response vehicle data via wireless communication and/or data transmission, wherein the emergency response vehicle data is representative of: emergency response vehicle origin, current location, current speed, current heading, current route, and/or current destination, and/or type of emergency, such as a vehicle accident or weather event; (2) generating or collecting, via or at the one or more processors mounted on the autonomous vehicle, autonomous vehicle data associated with the autonomous vehicle, wherein the autonomous vehicle data is representative of: the autonomous vehicle origination, current location, current speed, current heading, current route, and/or current destination; (3) generating, via or at the one or more processors mounted on the autonomous vehicle, emergency response vehicle warning data and/or alternate vehicle route data based upon computer analysis and/or comparison of the emergency response and autonomous vehicle data that is performed by the one or more processors mounted on the autonomous vehicle, the alternate vehicle route (i) directing the autonomous vehicle out of the way of the emergency response vehicle, (ii) avoids the route of the emergency response vehicle, and/or (iii) alleviates an amount that the autonomous vehicle interferes with a route of the emergency response vehicle; and/or (4) causing, via or at the one or more processors mounted on the autonomous vehicle, the autonomous vehicle to automatically take the alternate route and/or present the emergency response vehicle warning to a passenger within the autonomous vehicle to facilitate alleviating potential vehicle accidents between emergency response and autonomous vehicles, and/or shortening emergency response times for emergency response vehicles.

The method may further include adjusting an insurance policy, premium, rate, or discount for the autonomous vehicle based upon the autonomous vehicle having the vehicle warning and/or alternate vehicle route generation functionality. The method may include additional, less, or alternate functionality, including that discussed elsewhere herein, and/or the method may be implemented via a computer system, communication network, one or more processors, and/or computer-executable instructions stored on non-transitory storage media or computer-readable medium.

Exemplary Emergency Response Vehicle Implemented Method

In one aspect, a computer implemented method for generating data representative of an emergency response vehicle warning and/or alternate vehicle route may be provided. The method may include (1) generating or collecting, via or at one or more processors mounted on an emergency response vehicle, emergency response vehicle data (such as from vehicle-mounted sensors), wherein the emergency response vehicle data is representative of: emergency response vehicle origin, current location, current speed, current heading, current route, and/or current destination, and/or type of emergency, such as a vehicle accident or weather event; and/or (2) broadcasting or transmitting, via or at one or more processors or an associated transceiver mounted on the emergency response vehicle, the emergency response vehicle data, such as via wireless communication or data transmission, to autonomous vehicles or remote servers to facilitate one or more of the autonomous vehicles generating warnings associated with the emergency response vehicle and/or alternate routes to avoid the path of the emergency response vehicle to facilitate alleviating potential vehicle accidents between emergency response and autonomous vehicles, and/or shortening emergency response times for emergency response vehicles.

The method may further include adjusting an insurance policy, premium, rate, or discount for the emergency response vehicle based upon the autonomous vehicle having the emergency response vehicle data generation and/or broadcast functionality. The method may include additional, less, or alternate functionality, including that discussed elsewhere herein, and/or the method may be implemented via a computer system, communication network, one or more processors, and/or computer-executable instructions stored on non-transitory storage media or computer-readable medium.

Exemplary Warning and Alternate Route Generation

In one aspect, a computer implemented method for generating data representative of an emergency vehicle warning and/or alternate autonomous vehicle route may be provided. The method may include: (1) receiving, via or at one or more processors associated with, or mounted on, an autonomous vehicle, emergency vehicle data via wireless communication or data transmission, wherein the emergency vehicle data is representative of: emergency vehicle (i) origination, (ii) current location, (iii) current speed, (iv) current heading, (v) current route, and/or (vi) current destination, and/or (vii) type of emergency, such as a vehicle accident, house fire, medical emergency, or weather event; (2) generating or collecting, via or at the one or more processors associated with, or mounted on, the autonomous vehicle, autonomous vehicle data from one or more vehicle-mounted sensors, wherein the autonomous vehicle data is representative of: autonomous vehicle (a) origination, (b) current location, (c) current speed, (d) current heading, (e) current route, and/or (f) current destination; (3) generating, via or at the one or more processors associated with, or mounted on, the autonomous vehicle, emergency vehicle warning data and/or alternate vehicle route data based upon computer analysis or comparison of the emergency and autonomous vehicle data that is performed by the one or more processors associated with the autonomous vehicle, the alternate vehicle route directing the autonomous vehicle to avoid the route of the emergency vehicle, or otherwise alleviates an amount that the autonomous vehicle interferes with a route of the emergency vehicle; and/or (4) causing, via or at the one or more processors associated with, or mounted on, the autonomous vehicle, the emergency vehicle warning data and alternate vehicle route data, to be visually or audibly presented, or otherwise provided, to a driver of the autonomous vehicle to facilitate alleviating potential vehicle accidents between emergency response and autonomous vehicles, and/or shortening emergency response times for emergency vehicles.

The method may also include adjusting an insurance policy, premium, rate, or discount for the autonomous vehicle based upon the autonomous vehicle having the vehicle warning and/or alternate vehicle route generation functionality. The autonomous vehicle may be an autonomous or smart vehicle, and the autonomous or smart vehicle may automatically direct itself to take an alternate vehicle route and take self-driving actions that allow the autonomous or smart vehicle avoid the emergency vehicle or the route of the emergency vehicle.

The method may include adjusting an insurance policy, premium, rate, or discount for the autonomous vehicle based upon the autonomous vehicle having the vehicle warning and/or alternate vehicle route generation functionality. Additionally or alternatively, the method may include adjusting an insurance policy, premium, rate, or discount for the emergency response vehicle based upon the emergency response vehicle having the emergency response vehicle data generation and/or broadcast functionality.

The method may include generating, via the one or more processors mounted on the autonomous vehicle, insurance policy data for the driver of the autonomous vehicle based upon the driver following recommendations associated with emergency vehicle warnings or alternate vehicle routing that avoids emergency vehicles en route, and/or transmitting, via the one or more processors mounted on the autonomous vehicle, to an insurance provider remote server to facilitate the insurance provider (or insurance provider remote server) providing auto insurance cost savings to the driver (or other insured or vehicle owner) based upon the insurance policy data and/or functionality associated with emergency vehicle avoidance. The method may include additional, less, or alternate functionality, including that discussed elsewhere herein, and/or the method may be implemented via a computer system, communication network, one or more processors, and/or computer-executable instructions stored on non-transitory storage media or computer-readable medium.

Exemplary Vehicle Mounted System

In another aspect, a vehicle-mounted system of an autonomous vehicle for generating emergency vehicle warning data and/or alternate route data may be provided. The system may include one or more processors mounted on the autonomous vehicle configured to: (1) receive emergency vehicle data via wireless communication or data transmission, the emergency vehicle data being representative of: emergency vehicle (i) origination location, (ii) current location data, (iii) route, (iv) destination, (v) speed, and/or (vi) alternate routing; (2) generate or collect autonomous vehicle data, the autonomous vehicle data associated with the autonomous vehicle and being generated by one or more vehicle-mounted sensors or processors, the autonomous vehicle data is representative of: autonomous vehicle (a) origination location, (b) current location, (c) route, (d) destination, and/or (e) speed; (3) generate an alternate route based upon computer analysis or comparison of the emergency vehicle data and the autonomous vehicle data; and/or (4) present the alternate route to the driver of the vehicle, or the vehicle itself, such that the driver of the vehicle, or the vehicle itself, may avoid the route of the emergency vehicle or that shortening of the response time for emergency vehicles is facilitated.

The autonomous vehicle may be an autonomous vehicle that automatically avoids the route of the emergency vehicle based upon computer comparison or analysis of the emergency and autonomous vehicle data. Additionally or alternatively, the emergency vehicle may be an autonomous vehicle that automatically avoids the route of the autonomous vehicle based upon computer comparison or analysis of the emergency and autonomous vehicle data.

The one or more processors mounted on the autonomous vehicle may be further configured to: collect or generate, via the one or more processors mounted on the autonomous vehicle, insurance policy data for the driver of the autonomous vehicle based upon the driver following recommendations associated with emergency vehicle warnings or alternate vehicle routing that avoids emergency vehicles en route, and/or transmit, via the one or more processors mounted on the autonomous vehicle, the insurance policy data to an insurance provider remote server to facilitate the insurance provider or insurance provider remote server providing auto insurance cost savings to the driver (or other insured or vehicle owner) based upon the insurance policy data and/or functionality associated with emergency vehicle avoidance.

The one or more processors mounted on the autonomous vehicle may be further configured to: generate an emergency vehicle warning based upon computer analysis or comparison of the emergency vehicle data and the autonomous vehicle data; and/or present the emergency vehicle warning to the driver of the vehicle such that the driver of the vehicle, or the vehicle itself, may avoid the route of the emergency vehicle or that shortening of the response time for emergency vehicles is facilitated. The vehicle-mounted system may include additional, less, or alternate actions, including those discussed elsewhere herein.

Technical Advantages

The aspects described herein may be implemented as part of one or more computer components (such as an emergency vehicle device) and/or one or more back-end components (such as an autonomous vehicle device), for example. Furthermore, the aspects described herein may be implemented as part of a computer network architecture and/or a computing architecture that facilitates communications between various other devices and/or components. Thus, the aspects described herein address and solve issues of a technical nature that are necessarily rooted in computer technology.

For instance, some aspects include analyzing various sources of data to determine automatic autonomous vehicle operation based on emergency vehicle warning data. Once this is determined, the aspects may also allow for a determination of whether the emergency vehicle warning data has changed. In doing so, the aspects may overcome issues associated with the inconvenience of manual and/or unnecessary autonomous vehicle operation. Without the improvements suggested herein, additional processing and memory usage may be required to perform such vehicle operation, as an emergency vehicle device may need to download additional data and process this data as part of the automatic autonomous vehicle operation.

Furthermore, the embodiments described herein may function to optimize automatic operation of autonomous vehicles based on emergency vehicle warning data. The process may improve upon existing technologies by more accurately forecasting a user's account balance using additional data sources. Due to this increase in accuracy, the aspects may address computer-related issues regarding efficiency over the traditional amount of processing power and models used to operate emergency vehicles and autonomous vehicles. Thus, the aspects may also address computer related issues that are related to efficiency metrics, such as consuming less power, for example.

Additional Considerations

This detailed description is to be construed as exemplary only and does not describe every possible embodiment, as describing every possible embodiment would be impractical, if not impossible. One may implement numerous alternate embodiments, using either current technology or technology developed after the filing date of this application.

Further to this point, although the embodiments described herein often utilize credit report information as an example of sensitive information, the embodiments described herein are not limited to such examples. Instead, the embodiments described herein may be implemented in any suitable environment in which it is desirable to identify and control specific type of information. For example, the aforementioned embodiments may be implemented by a governmental agency that operates emergency vehicles, etc. To provide another example, the aforementioned embodiments may be implemented by autonomous vehicle operator to not only identify, re-route, and quarantine autonomous vehicle information, but to apply similar techniques to prevent the dissemination of autonomous vehicle operation data that is preferably delivered in accordance with a more secure means (e.g., via a secure login to a web server) than via email.

Furthermore, although the present disclosure sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software), may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of some of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. A computer implemented method for generating data representative of an emergency vehicle warning, the method comprising:

receiving, at a processor of a computing device, emergency vehicle data;

receiving, at a processor of a computing device, autonomous vehicle data;

generating, using a processor of a computing device, emergency vehicle warning data, based upon the emergency vehicle data and the autonomous vehicle data, in response to the processor executing an emergency vehicle route data generation module; and generating, using a processor of a computing device, insurance-related data, based upon the emergency vehicle warning data, in response to the processor executing an insurance-related data generation module, wherein the insurance-related data is representative of an insurance risk associated with an autonomous vehicle, and wherein the insurance risk is lower for an autonomous vehicle that is equipped with an emergency vehicle warning data receiving device, and/or wherein the insurance-related data is representative of an insurance risk associated with an emergency vehicle, and wherein the insurance risk is lower for an emergency vehicle that is equipped with an emergency vehicle warning data generation and receiving device.

2. The method of claim 1, wherein receiving the emergency vehicle data comprises receiving, in response to the processor executing an emergency vehicle data receiving module, the emergency vehicle data representative of at least one of: emergency vehicle origination position data, emergency vehicle existing position data, emergency vehicle course data, and emergency vehicle end position data.

3. The method of claim 1, wherein receiving the autonomous vehicle data comprises receiving, in response to the processor executing an autonomous vehicle data receiving module, the autonomous vehicle data representative of at least one of: autonomous vehicle origination position data, autonomous vehicle existing position data, autonomous vehicle course data, and autonomous vehicle end position data.

4. The method of claim 1, further comprising:
transmitting, using a processor of a computing device, the emergency vehicle warning data, to an autonomous vehicle, in response to the processor executing an emergency vehicle warning data transmission module.

5. The method of claim 1, further comprising:
transmitting, using a processor of a computing device, the emergency vehicle data, from an emergency vehicle to an autonomous vehicle, in response to the processor executing an emergency vehicle data transmission module.

6. The method of claim 1, further comprising:
generating, using a processor of a computing device, autonomous vehicle route data, based upon the emergency vehicle data and the autonomous vehicle data, in response to the processor executing an autonomous emergency vehicle route data generation module.

7. A system for generating emergency vehicle warning data, the system comprising:
an emergency vehicle data receiving module stored on a memory that, when executed by a processor of a computing device, causes the processor to receive emergency vehicle data;
an autonomous vehicle data receiving module stored on a memory that, when executed by a processor of a computing device, causes the processor to receive autonomous vehicle data;
an emergency vehicle warning data generation module stored on a memory that, when executed by a processor of a computing device, causes the processor to generate emergency vehicle warning data, based upon the emergency vehicle data and the autonomous vehicle data; and
an insurance-related data generation module stored on a memory that, when executed by a processor of a computing device, causes the processor to generate insurance-related data, based upon the emergency vehicle warning data, wherein the insurance-related data is representative of an insurance risk associated with an autonomous vehicle, and wherein the insurance risk is lower for an autonomous vehicle that is equipped with an emergency vehicle warning data receiving device, and/or wherein the insurance-related data is representative of an insurance risk associated with an emergency vehicle, and wherein the insurance risk is lower for an emergency vehicle that is equipped with an emergency vehicle warning data generation and receiving device.

8. The system of claim 7, wherein the emergency vehicle data receiving module causes the processor to receive emergency vehicle data representative of at least one of: emergency vehicle origination location data, emergency vehicle current location data, emergency vehicle route data, and emergency vehicle destination location data; and
wherein the autonomous vehicle data receiving module causes the processor to receive autonomous vehicle data representative of at least one of: autonomous vehicle origination location data, autonomous vehicle current location data, autonomous vehicle route data, and autonomous vehicle destination location data.

9. The system of claim 7, further comprising:
an emergency vehicle data transmission module stored on a memory that, when executed by a processor of a computing device, causes the processor to transmit the emergency vehicle data from an emergency vehicle to an autonomous vehicle via a point-to-point communication link.

10. The system of claim 7, further comprising:
an emergency vehicle warning data transmission module stored on a memory that, when executed by a processor of a computing device, causes the processor to transmit the emergency vehicle warning data from a processor of a remote emergency management services device to an autonomous vehicle via a cellular telephone network.

11. The system of claim 7, wherein the emergency vehicle data receiving module, the autonomous vehicle data receiving module, and the autonomous vehicle route data generation module are executed by a processor of a remote emergency management services device, and the remote emergency management services device further comprises:
an insurance-related data generation module stored on a memory that, when executed by the processor of the remote emergency management services device, causes the processor to generate insurance-related data, based upon the emergency vehicle warning data.

12. A non-transitory computer-readable medium storing instructions that, when executed by a processor of a computing device, causes the processor to automatically generate emergency vehicle warning data, the non-transitory computer-readable medium comprising:
an emergency vehicle data receiving module that, when executed by a processor of a computing device, causes the processor to receive emergency vehicle data;
an autonomous vehicle data receiving module that, when executed by a processor of a computing device, causes the processor to receive autonomous vehicle data;
an emergency vehicle warning data generation module that, when executed by a processor of a computing device, causes the processor to generate emergency vehicle warning data, based upon the emergency vehicle data and the autonomous vehicle data; and
generating, using a processor of a computing device, insurance-related data, based upon the emergency vehicle warning data, in response to the processor executing an insurance-related data generation module, wherein the insurance-related data is representative of an insurance risk associated with an autonomous vehicle, and wherein the insurance risk is lower for an autonomous vehicle that is equipped with an emergency vehicle warning data receiving device, and/or wherein the insurance-related data is representative of an insurance risk associated with an emergency vehicle, and wherein the insurance risk is lower for an emergency vehicle that is equipped with an emergency vehicle warning data generation and receiving device.

13. The non-transitory computer-readable medium of claim 12, further comprising:
an emergency vehicle warning presentation module that, when executed by a processor of a computing device, causes the processor to generate an emergency vehicle warning presentation based upon the emergency vehicle warning data.

14. The non-transitory computer-readable medium of claim 12, further comprising:
an autonomous vehicle route data generation module that, when executed by a processor of a computing device, causes the processor to generate autonomous vehicle route data, based upon the emergency vehicle data and the autonomous vehicle data.

15. The non-transitory computer-readable medium of claim 12, further comprising:
an emergency vehicle data transmission module that, when executed by a processor of a computing device, causes the processor to transmit emergency vehicle data from a first emergency vehicle to a second emergency vehicle.

16. The non-transitory computer-readable medium of claim 12, further comprising:
an emergency vehicle warning data transmission module that, when executed by a processor of a computing device, causes the processor to transmit emergency vehicle warning data from the processor to an emergency vehicle.

17. The non-transitory computer-readable medium of claim 12, further comprising:
- an autonomous vehicle alternate route presentation module that, when executed by a processor of a computing device, causes the processor to generate an autonomous vehicle alternate route presentation based upon the emergency vehicle warning data.

18. The non-transitory computer-readable medium of claim 12, further comprising:
- an effected geographic area data generation module that, when executed by a processor of a computing device, causes the processor to generate effected geographic area data based upon the emergency vehicle data; and
- an emergency vehicle data warning transmission module that, when executed by a processor of a computing device, causes the processor to transmit emergency vehicle warning data autonomous vehicles based upon the effected geographic area data.

19. The non-transitory computer-readable medium of claim 12, further comprising:
- an emergency vehicle data transmission module that, when executed by a processor of a computing device, causes the processor to transmit emergency vehicle data to an autonomous vehicle.

20. The non-transitory computer-readable medium of claim 12, further comprising:
- an emergency vehicle warning data generation module that, when executed by a processor of a computing device, causes the processor to generate emergency vehicle warning data, based upon the emergency vehicle data and the autonomous vehicle data; and
- an emergency vehicle warning data transmission module that, when executed by a processor of a computing device, causes the processor to transmit emergency vehicle warning data from the processor to an autonomous vehicle.

* * * * *